United States Patent
Raju et al.

(10) Patent No.: US 10,728,155 B2
(45) Date of Patent: Jul. 28, 2020

(54) INTER-DATACENTER MULTICAST SYSTEM

(71) Applicant: Dell Products L.P., Round Rock, TX (US)

(72) Inventors: Pradeep Raju, Tamil Nadu (IN); Senthil Nathan Muthukaruppan, Askok Nagar Chennai (IN); Balaji Venkat Venkataswami, Tamil Nadu (IN)

(73) Assignee: Dell Products L.P., Round Rock, TX (US)

( * ) Notice: Subject to any disclaimer, the term of this patent is extended or adjusted under 35 U.S.C. 154(b) by 47 days.

(21) Appl. No.: 16/035,219

(22) Filed: Jul. 13, 2018

(65) Prior Publication Data

US 2020/0021529 A1 Jan. 16, 2020

(51) Int. Cl.
| | |
|---|---|
| *H04L 12/801* | (2013.01) |
| *H04L 12/761* | (2013.01) |
| *H04L 12/741* | (2013.01) |
| *H04L 12/46* | (2006.01) |
| H04L 12/753 | (2013.01) |

(52) U.S. Cl.
CPC .......... *H04L 47/15* (2013.01); *H04L 12/4641* (2013.01); *H04L 45/16* (2013.01); *H04L 45/74* (2013.01); *H04L 45/48* (2013.01)

(58) Field of Classification Search
CPC ......... H04L 47/15; H04L 45/16; H04L 45/74; H04L 12/4641; H04L 45/48
See application file for complete search history.

(56) References Cited

U.S. PATENT DOCUMENTS

| | | | | |
|---|---|---|---|---|
| 7,719,958 B1* | 5/2010 | Azimi | ..................... | H04L 12/18 370/220 |
| 7,936,753 B1* | 5/2011 | Colloff | ................ | H04L 12/1868 370/390 |
| 2012/0246276 A1* | 9/2012 | Matsubara | .............. | H04L 47/22 709/219 |
| 2014/0003427 A1* | 1/2014 | Nishi | ...................... | H04L 45/16 370/390 |
| 2014/0044129 A1* | 2/2014 | Mentze | ................. | H04L 49/354 370/390 |
| 2015/0085862 A1* | 3/2015 | Song | ................... | H04L 12/4641 370/390 |

(Continued)

*Primary Examiner* — Hoang-Chuong Q Vu

(74) *Attorney, Agent, or Firm* — Haynes and Boone, LLP

(57) ABSTRACT

An inter-datacenter multicast system includes a first datacenter connected to a second datacenter. A first multicast router device is located in the first datacenter and includes at least one first multicast router interface that provides a link to the second datacenter, and a second multicast router device is located in the second datacenter and includes at least one second multicast router interface that provides a link to the first datacenter. The first multicast router device and the second multicast router device sync multicast routes with each other to enable each to act as respective designated routers, and also each remove multicast router interfaces that provides links to the other datacenter from outgoing interface Virtual Local Area Networks (VLANs) that are part of a multicast route, which prevents traffic tromboning and reduces multicast data communications between the first datacenter and the second datacenter.

17 Claims, 17 Drawing Sheets

(56) References Cited

U.S. PATENT DOCUMENTS

| | | |
|---|---|---|
| 2015/0312135 A1 | 10/2015 | Moopath Velayudhan et al. |
| 2018/0034648 A1* | 2/2018 | Nagarajan ............. H04L 12/185 |
| 2018/0139127 A1* | 5/2018 | Srinivasan ............. H04L 45/48 |
| 2018/0159781 A1* | 6/2018 | Mehta ..................... H04L 47/22 |
| 2018/0248803 A1* | 8/2018 | Nagarajan ............... H04L 47/18 |
| 2018/0331953 A1* | 11/2018 | Hoang .................... H04L 45/50 |
| 2019/0229937 A1* | 7/2019 | Nagarajan ............... H04L 12/18 |

* cited by examiner

INTER-DATACENTER MULTICAST SYSTEM

BACKGROUND

The present disclosure relates generally to information handling systems, and more particularly to transmitting multicast communications between information handling systems across different datacenters.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, storage devices, switch devices, router devices, and/or other computing devices are often provided in datacenters. It is sometimes desirable for information handling systems in different datacenters to communicate, and often those information handling systems may be provided as part of the same Virtual Local Area Network (VLAN) in order to facilitate that communication, which may be performed over a Layer 3 (L3) network (e.g., the Internet) and/or a Layer 2 (L2) network that are provided between the datacenters. One example of such datacenters provides router devices in the datacenters that interface with both the L3 network (which is connected to the peer datacenter(s)), as well as a Layer 2 (L2) network within their respective datacenter. That L2 network may be provided by the router devices, Top Of Rack (TOR) switch devices connected to the router devices, and server devices connected to the TOR switch devices.

In a specific example, the router devices, TOR switch devices, and server devices may be connected via Multi-chassis Link Aggregation Groups (MLAGs), with the router devices connected via Virtual Link Trunking (VLT) (an aggregation protocol available from Dell Inc. of Round Rock, Tex., United States). Each server device may provide (or "host") virtual machines that may be migrated within a datacenter and across the datacenters using a variety of virtual machine migration techniques (or container deployment instantiation techniques) known in the art. Those virtual machine may act as data communication sources ("source virtual machines") and/or data communication receivers ("receiver virtual machines"), and often the receiver virtual machines may belong to Protocol Independent Multicast-Sparse Mode (PIM-SM) or Protocol Independent Multicast-Secure Specific Multicast (PIM-SSM) multicast trees that are provided across the multiple datacenters. As such, a VLAN may include virtual machines in different datacenters, resulting in an L2 network domain spanning across those different datacenters, which can cause some issues.

In such multi-datacenter systems, the first hop router device/designated router device ("FHR/DR device") for a source virtual machine that is provided on a server device may be relatively remote from that server device. For example, a source virtual machine provided on a server device in a first datacenter may have a FHR/DR device in a second datacenter, and that FHR/DR device may also be a last hop router/designated router device ("LHR/DR device") for a receiver virtual machine is also provided by a server device in the first datacenter. In such a scenario, data communication from the source virtual machine will be sent out of the first datacenter and to the FHR/DR device-LHR/DR device in the second datacenter, and then forwarded by the FHR/DR device-LHR/DR device back to the receiver virtual machine in the first datacenter. As such, the data communications from the source virtual machine to the receiver virtual machine will traverse the inter-datacenter links in the L2 network twice in a phenomenon called "traffic tromboning", which increases the latency associated with the data traffic, as well as the traffic load on the MLAGs provided in the L2 network between the datacenters.

Furthermore, in addition to traffic tromboning, multi-datacenter systems often provide multiple copies of the same data communication across the inter-datacenter links in the L2 network. For example, a source virtual machine that is provided by a server device in a first datacenter and that is part of a first VLAN may have a FHR/DR device in the first datacenter. That FHR/DR device may include a multicast route with the first VLAN as an incoming interface, and multiple VLANs as the outgoing interface, with those multiple VLANs including receiver virtual machines that are provided by server device(s) in a second datacenter. When the FHR/DR device is also a LHR/DR device for the receiver virtual machines, a multicast communication sent by the source virtual machine and received by the FHR/DR device-LHR/DR/RP device in the first datacenter will be replicated for each VLAN including a receiver virtual machine, and those replicated communications are then sent over the MLAGs provided in the L2 network to the second datacenter so that each replicated communication may be provided to those receiver virtual machines. As such, multicast communications in multi-datacenter systems can greatly increase the amount of communications sent via inter-datacenter communication links.

Accordingly, it would be desirable to provide an improved inter-datacenter multicast system.

SUMMARY

According to one embodiment, an Information Handling System (IHS) includes a communication system; a processing system that is coupled to the communication system; and a memory system that is coupled to the processing system and that includes instructions that, when executed by the processing system, cause the processing system to provide a routing engine that is included in a first datacenter and that is configured to: sync multicast routes with a multicast router device in a second datacenter that is coupled to the communication system, wherein the syncing of multicast routes between the routing engine and the multicast router device configures each of the routing engine and the multicast router device to act as respective designated routers; and remove each interface in the communication system that provides a link to the second datacenter from outgoing interface Virtual Local Area Networks (VLANs) that are part of a multicast route.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
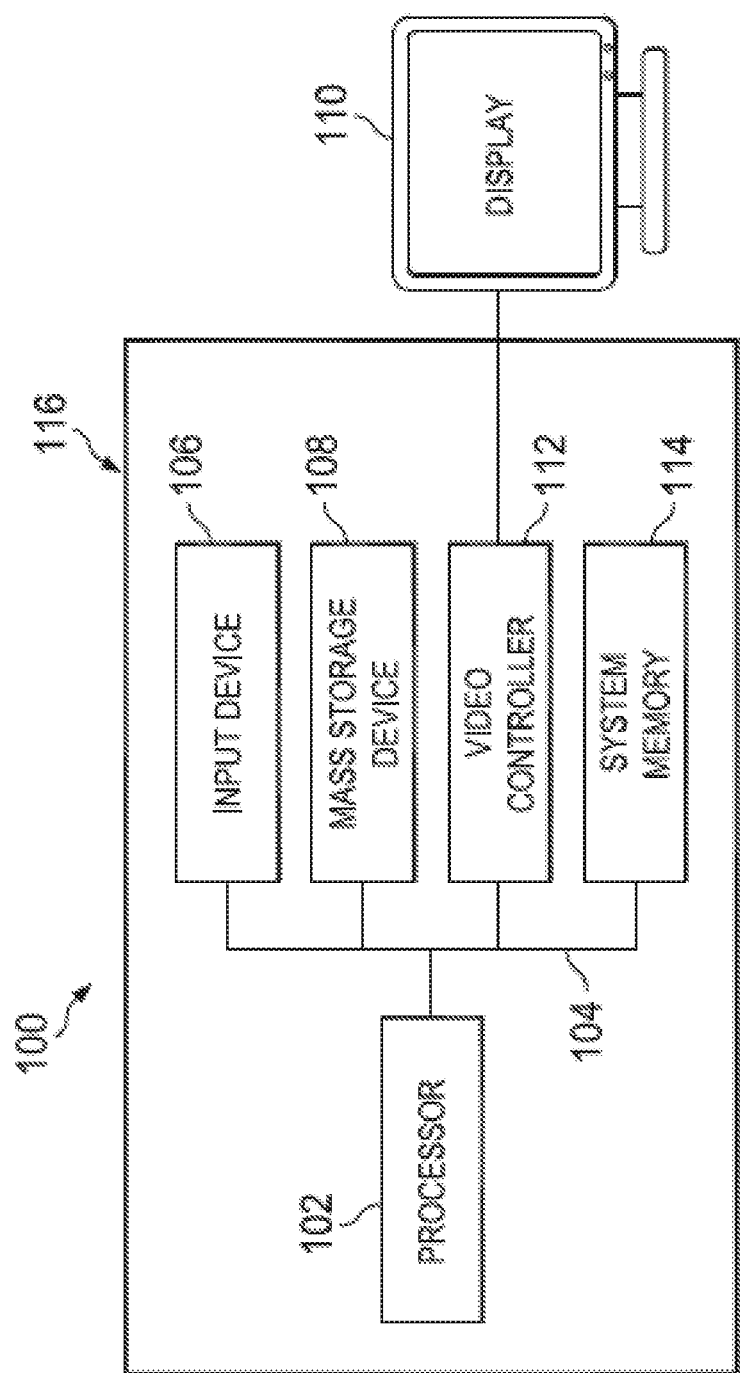
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
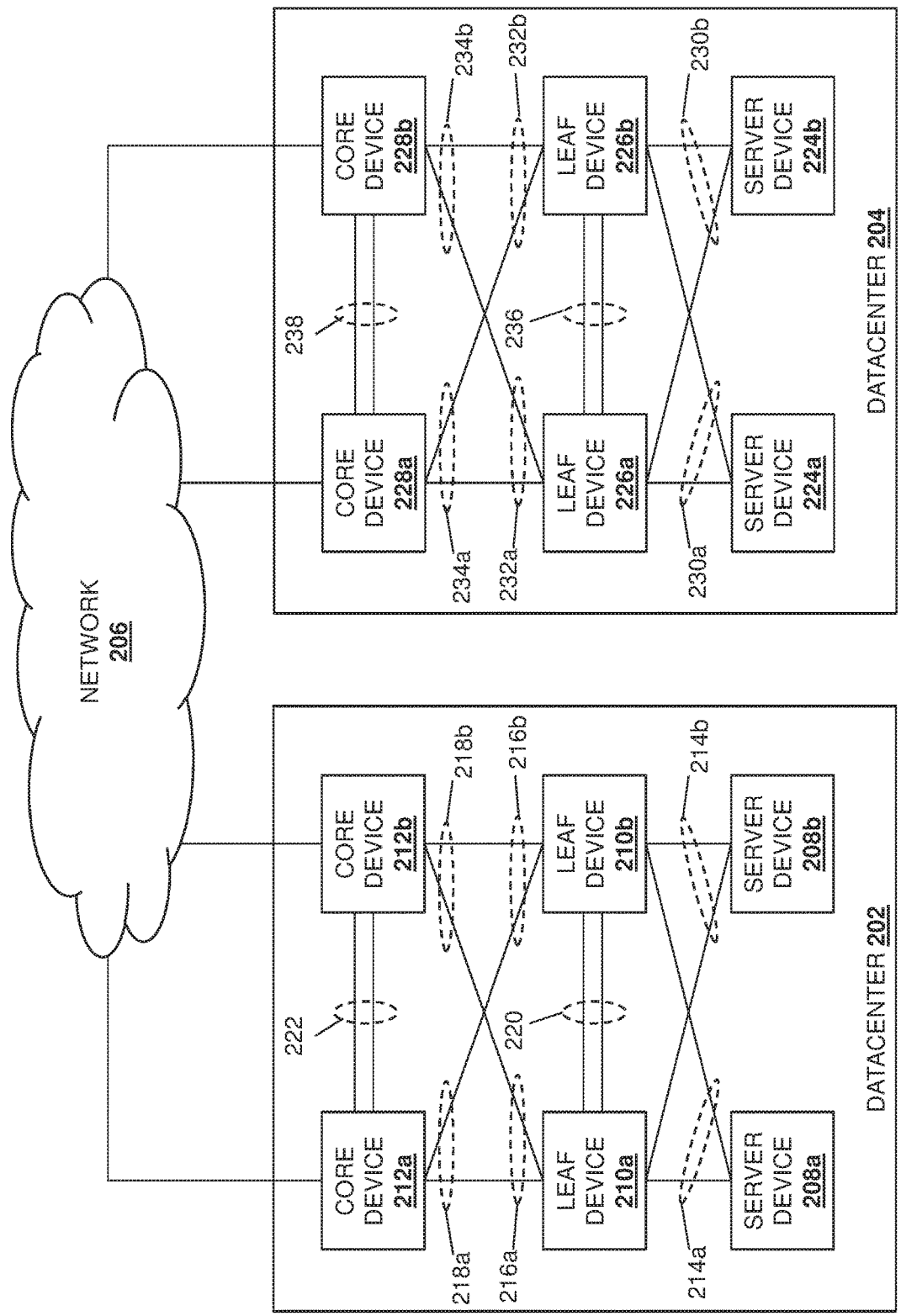
FIG. 2A is a schematic view illustrating an embodiment of a multi-datacenter system.
Figure 2B:
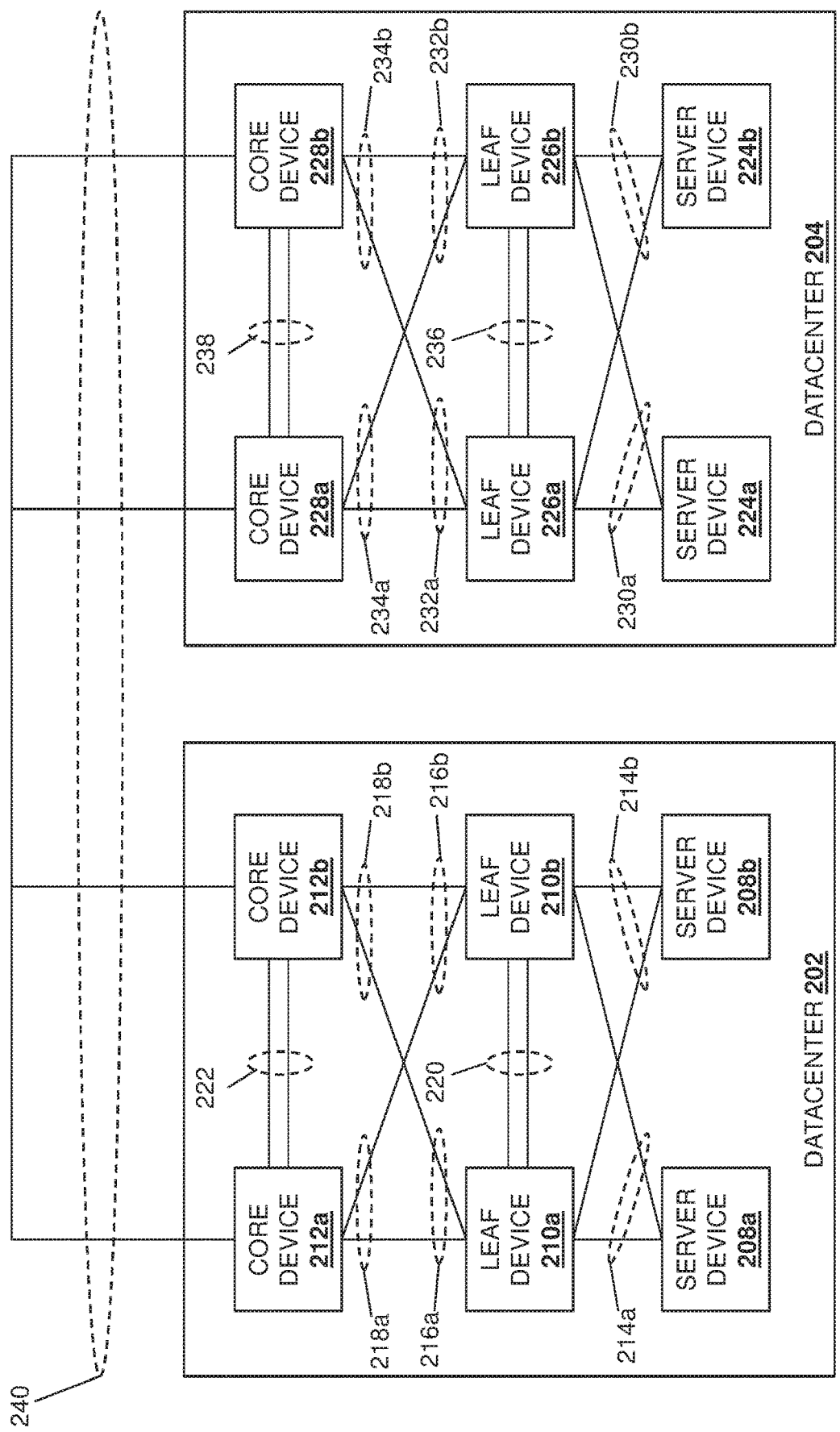
FIG. 2B is a schematic view illustrating an embodiment of the multi-datacenter system of FIG. 2A.

Referring now to FIGS. 2A and 2B, an embodiment of an multi-datacenter system 200 is illustrated. In the embodiments illustrated and described below, the multi-datacenter system 200 is provided by a datacenter 202 that is coupled to a datacenter 204 by a network 206, as illustrated in FIG. 2A. However, one of skill in the art in possession of the present disclosure will recognize that the multi-datacenter system 200 illustrated and described in the examples below has been greatly simplified, and that the teachings of the present disclosure may be provided to systems with more datacenters that those illustrated, and/or datacenters with many more devices that illustrated. As discussed below, the network 206 illustrated in FIG. 2A may be provided by a Layer 3 (L3) network such as, for example, the Internet, although one of skill in the art in possession of the present disclosure will recognize that other networks may fall within the scope of the present disclosure as well.

In the illustrated embodiment, the datacenter 202 includes server devices 208a and 208b, either of which may be provided by the IHS 100 of FIG. 1 and/or include the components of the IHS 100. As discussed in further detail below, either of the server devices 208*a* and 208*b* may include hardware and software that is configured to provide one or more virtual machines that may be configured to send multicast data communications (referred to below as "source virtual machines") and/or receive multicast data communications (referred to below as "receiver virtual machines"). Further, as also discussed below, virtual machine(s) provided by the server devices 208*a* and 208*b* may be included as part of Virtual Local Area Networks (VLANs) that are utilized in the sending and receiving of multicast communications.

The datacenter 202 also includes an access layer that is provided by leaf devices 210*a* and 210*b*, either of which may be provided by the IHS 100 of FIG. 1 and/or include the components of the IHS 100. In a specific example the leaf devices 210*a* and 210*b* may be provided by Top Of Rack (TOR) switch devices that are coupled to the server devices 208*a* and 208*b*, although one of skill in the art in possession of the present disclosure will recognize that other types of leaf devices will fall within the scope of the present disclosure as well. The datacenter 202 also includes a core layer that is provided by core devices 212*a* and 212*b*, either of which may be provided by the IHS 100 of FIG. 1 and/or include the components of the IHS 100. In a specific example the core devices 212*a* and 212*b* may be provided by router devices that are coupled to the leaf devices 210*a* and 210*b*, although one of skill in the art in possession of the present disclosure will recognize that other types of core devices will fall within the scope of the present disclosure as well.

In the illustrated embodiment, a particular device coupling scheme for the devices in the datacenter 202 is illustrated. For example, a Multi-chassis Link Aggregation Group (MLAG) 214*a* may be provided to couple the server device 208*a* to each of the leaf devices 210*a* and 210*b*, and an MLAG 214*b* may be provided to couple the server device 208*b* to each of the leaf devices 210*a* and 210*b*. Similarly, an MLAG 216*a* may be provided to couple the leaf device 210*a* to each of the core devices 212*a* and 212*b*, an MLAG 216*b* may be provided to couple the leaf device 210*b* to each of the core devices 212*a* and 212*b*, an MLAG 218*a* may be provided to couple the core device 212*a* to each of the leaf devices 210*a* and 210*b*, and an MLAG 218*b* may be provided to couple the core device 212*b* to each of the leaf devices 210*a* and 210*b*. Furthermore, a leaf device Inter-Chassis Link (ICL) 220 may be provided between the leaf devices 210*a* and 210*b*, and a core device ICL 222 may be provided between the core devices 212*a* and 212*b*. In a specific example, at least some of the coupling scheme illustrated in FIG. 2 may be enabled via Virtual Link Trunking (VLT), an aggregation protocol available from Dell Inc. of Round Rock, Tex., United States.

Similarly, in the illustrated embodiment, the datacenter 204 includes server devices 224*a* and 224*b*, either of which may be provided by the IHS 100 of FIG. 1 and/or include the components of the IHS 100. As discussed in further detail below, either of the server devices 224*a* and 224*b* may include hardware and software that is configured to provide one or more virtual machines that may be configured to send multicast data communications (referred to below as "source virtual machines") and/or receive multicast data communications (referred to below as "receiver virtual machines"). Further, as also discussed below, virtual machine(s) provided by the server devices 224*a* and 224*b* may be included as part of Virtual Local Area Networks (VLANs) that are utilized in the sending and receiving of multicast communications.

The datacenter 204 also includes an access layer that is provided by leaf devices 226*a* and 226*b*, either of which may be provided by the IHS 100 of FIG. 1 and/or include the components of the IHS 100. In a specific example the leaf devices 226*a* and 226*b* may be provided by Top Of Rack (TOR) switch devices that are coupled to the server devices 224*a* and 224*b*, although one of skill in the art in possession of the present disclosure will recognize that other types of leaf devices will fall within the scope of the present disclosure as well. The datacenter 204 also includes a core layer that is provided by core devices 228*a* and 228*b*, either of which may be provided by the IHS 100 of FIG. 1 and/or include the components of the IHS 100. In a specific example the core devices 228*a* and 228*b* may be provided by router devices that are coupled to the leaf devices 226*a* and 226*b*, although one of skill in the art in possession of the present disclosure will recognize that other types of core devices will fall within the scope of the present disclosure as well.

In the illustrated embodiment, a particular device coupling scheme for the devices in the datacenter 204 is illustrated. For example, a Multi-chassis Link Aggregation Group (MLAG) 230*a* may be provided to couple the server device 224*a* to each of the leaf devices 226*a* and 226*b*, and an MLAG 230*b* may be provided to couple the server device 224*b* to each of the leaf devices 226*a* and 226*b*. Similarly, an MLAG 232*a* may be provided to couple the leaf device 226*a* to each of the core devices 228*a* and 228*b*, an MLAG 232*b* may be provided to couple the leaf device 226*b* to each of the core devices 228*a* and 228*b*, an MLAG 234*a* may be provided to couple the core device 228*a* to each of the leaf devices 226*a* and 226*b*, and an MLAG 234*b* may be provided to couple the core device 228*b* to each of the leaf devices 226*a* and 226*b*. Furthermore, a leaf device Inter-Chassis Link (ICL) 236 may be provided between the leaf devices 226*a* and 226*b*, and a core device ICL 238 may be provided between the core devices 228*a* and 228*b*. In a specific example, at least some of the coupling scheme illustrated in FIG. 2 may be enabled via VLT.

As can be seen in FIG. 2B, an MLAG 240 may be provided to couple the core devices 212*a*, 212*b*, 228*a*, and 228*b* to each other. For example, VLT may be utilized to provide the MLAG 240, and one of skill in the art in possession of the present disclosure will recognize that such a core layer in the datacenter 202 of FIG. 2B may be provided by a "square routed VLT" that provides the MLAG 240. As such, in some embodiments, an L3/L2 boundary (e.g., the boundary between the L3 network provided by the network 206 and a Layer 2 (L2) network existing within the datacenters 202 and 204) may exist between the square routed VLT provided between the core devices 212*a*, 212*b*, 228*a*, and 228*b* that connect to the L3 network 206, and the L2 network in the respective datacenters of those core devices.

Figure 3:
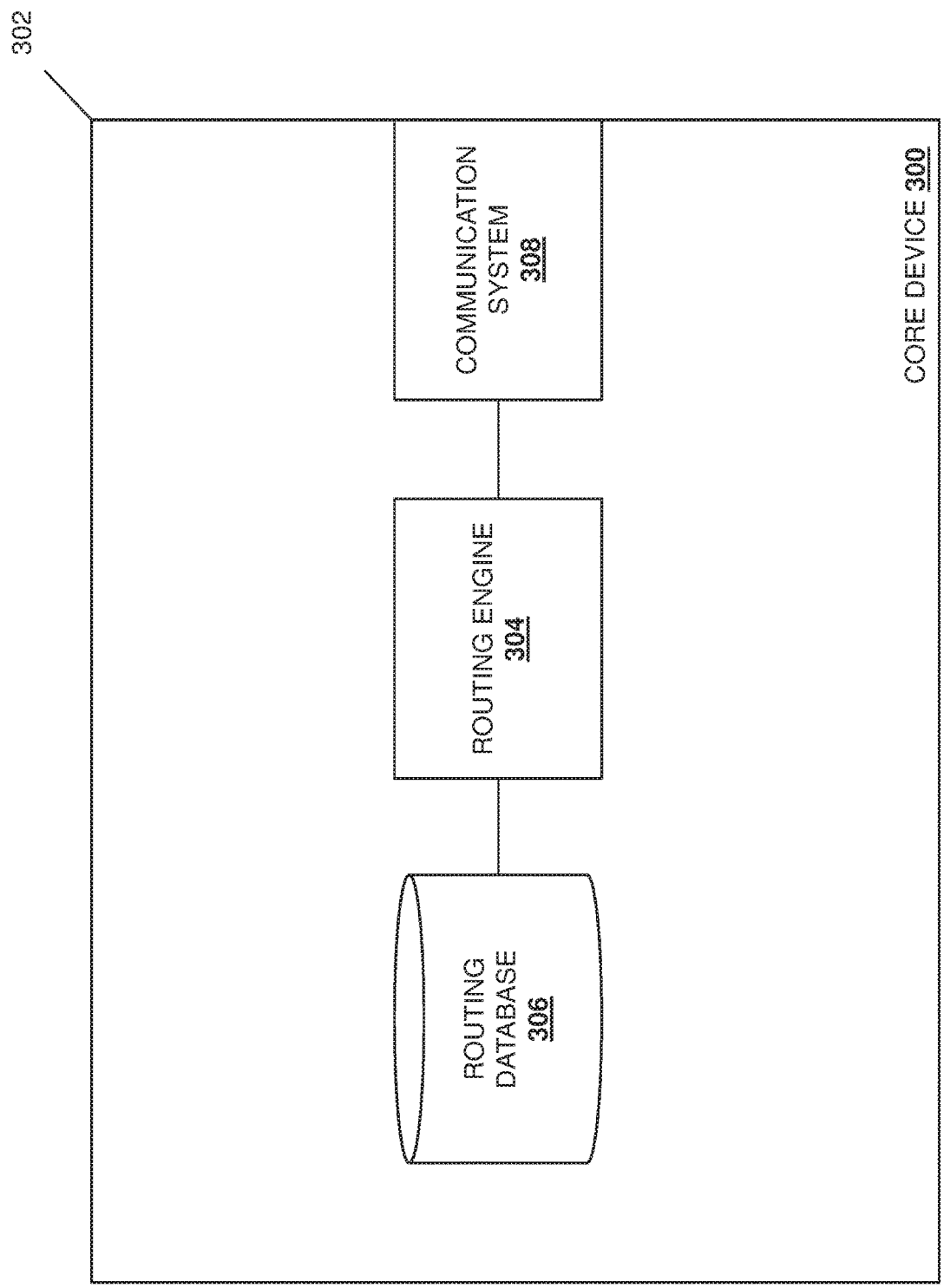
FIG. 3 is a schematic view illustrating an embodiment of a core device used in the multi-datacenter system of FIG. 2.

Referring now to FIG. 3, an embodiment of a core device 300 is illustrated. In an embodiment, the core device 300 may provide any of the core devices 212*a*, 212*b*, 228*a*, and/or 228*b* discussed above with reference to FIG. 2. As such, the core device 300 may be provided by the IHS 100 and/or may include some or all of the components of the IHS 100, and in specific examples may be provided by a router device, although other devices that would be apparent to one of skill in the art in possession of the present disclosure will fall within the scope of the present disclosure as well. In the illustrated embodiment, the core device 300 includes a chassis 302 that houses the components of the core device 300, only some of which are illustrated in FIG. 3. For example, the chassis 302 may house a processing system (not illustrated, but which may include the processor 102 discussed above with reference to FIG. 1) and a memory system (no illustrated, but which may include the memory 114 of FIG. 1) that is coupled to the processing system and that include instructions that, when executed by the processing system, cause the processing system to provide a routing engine 304 that is configured to perform the functionality of the routing engines and core devices discussed below.

The chassis 302 may also house a storage system (not illustrated, but which may include the storage device 108 discussed above with reference to FIG. 1) that is coupled to the routing engine 304 (e.g., via a coupling between the storage system and the processing system) and that may include a routing database 306 that may store any of the information utilized by the routing engine 304 as discussed below. The chassis 302 may also house a communication system 308 that is coupled to the routing engine 304 (e.g., via a coupling between the communication system 308 and the processing system) and that may include a Network Interface Controller (NIC), a wireless communication system (e.g., a BLUETOOTH® communication subsystem, a Near Field Communication (NFC) system, a WIFI communication subsystem, etc.), and/or other communication components that would be apparent to one of skill in the art in possession of the present disclosure. In a specific example, the communication system 308 may include core device communication interfaces such as, for example, router interfaces for coupling to the network 206 (e.g., L3 interface(s) for coupling to an L3 network), the leaf devices 210a, 210b, 226a, and/or 226b and the core devices 212a, 212b, 228a, and/or 228b (e.g., L2 interface(s) for coupling to an L2 network). While a specific example has been provided, one of skill in the art in possession of the present disclosure will recognize that core devices may include a variety of components and component configurations for providing conventional core device functionality, as well as the functionality discussed below, while remaining within the scope of the present disclosure.

Figure 4:
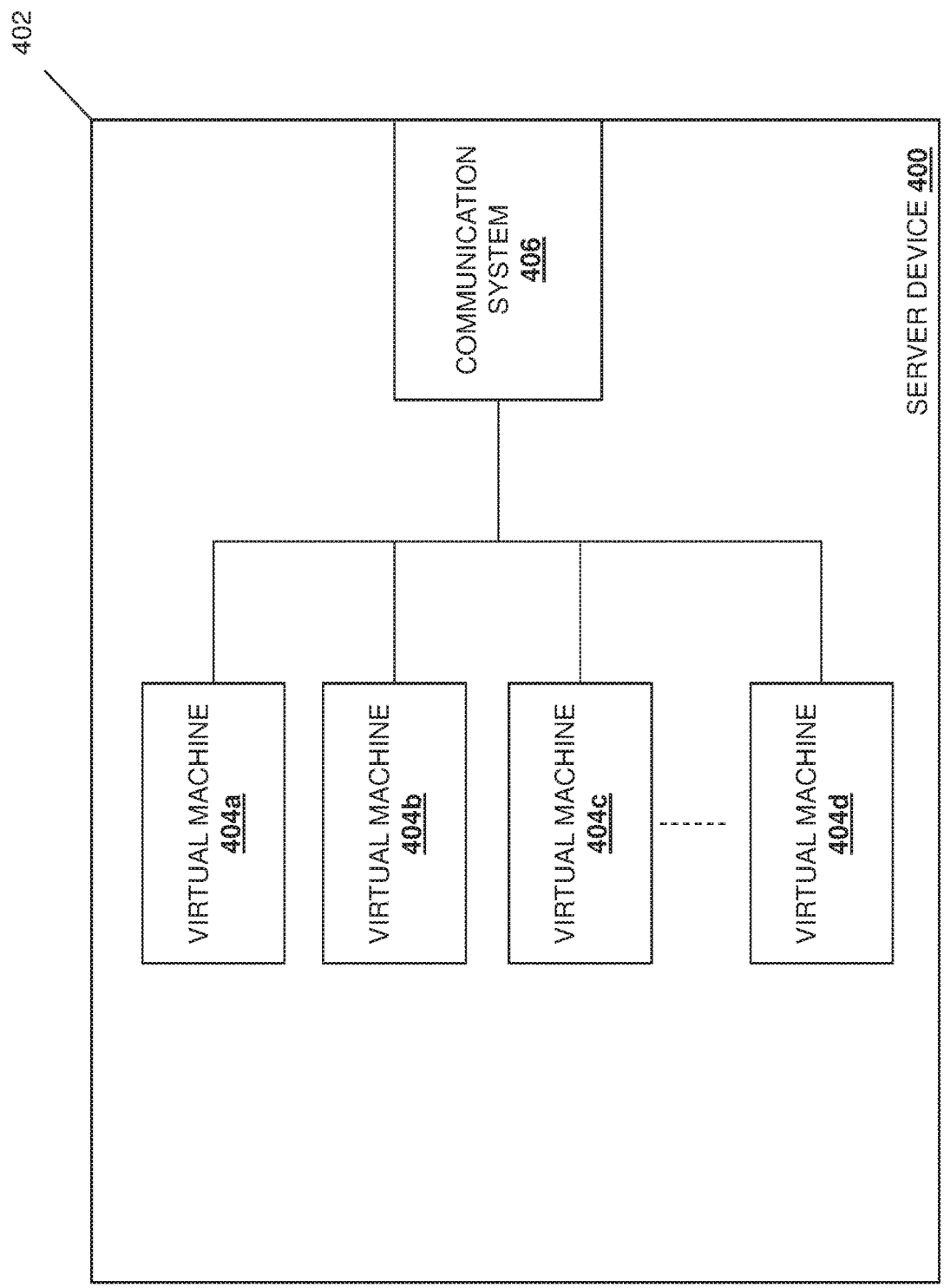
FIG. 4 is a schematic view illustrating an embodiment of a server device used in the multi-datacenter system of FIG. 2.

Referring now to FIG. 4, an embodiment of a server device 400 is illustrated. In an embodiment, the server device 400 may provide any of the server devices 208a, 208b, 224a, and/or 224b discussed above with reference to FIG. 2. As such, the server device 400 may be provided by the IHS 100 and/or may include some or all of the components of the IHS 100, and in specific examples may be provided by a server device configured to host one or more virtual machines, although other devices that would be apparent to one of skill in the art in possession of the present disclosure will fall within the scope of the present disclosure as well. In the illustrated embodiment, the server device 400 includes a chassis 402 that houses the components of the server device 400, only some of which are illustrated in FIG. 4. For example, the chassis 402 may house a processing system (not illustrated, but which may include the processor 102 discussed above with reference to FIG. 1) and a memory system (no illustrated, but which may include the memory 114 of FIG. 1) that is coupled to the processing system and that include instructions that, when executed by the processing system, cause the processing system to provide virtual machines 404a, 404b, 404c, and up to 404d that are configured to perform the functionality of the virtual machines and server devices discussed below.

The chassis 402 may also house a communication system 406 that is coupled to the virtual machines 404a-d (e.g., via a coupling between the communication system 406 and the processing system) and that may include a Network Interface Controller (NIC), a wireless communication system (e.g., a BLUETOOTH® communication subsystem, a Near Field Communication (NFC) system, a WIFI communication subsystem, etc.), and/or other communication components that would be apparent to one of skill in the art in possession of the present disclosure. In a specific example, the communication system 408 may include server device communication interfaces such as, for example, server interfaces for coupling to the leaf devices 210a, 210b, 226a, and/or 226b (e.g., L2 interface(s) for coupling to an L2 network). While a specific example has been provided, one of skill in the art in possession of the present disclosure will recognize that server devices may include a variety of components and component configurations for providing conventional server device functionality, as well as the functionality discussed below, while remaining within the scope of the present disclosure.

Figure 5:
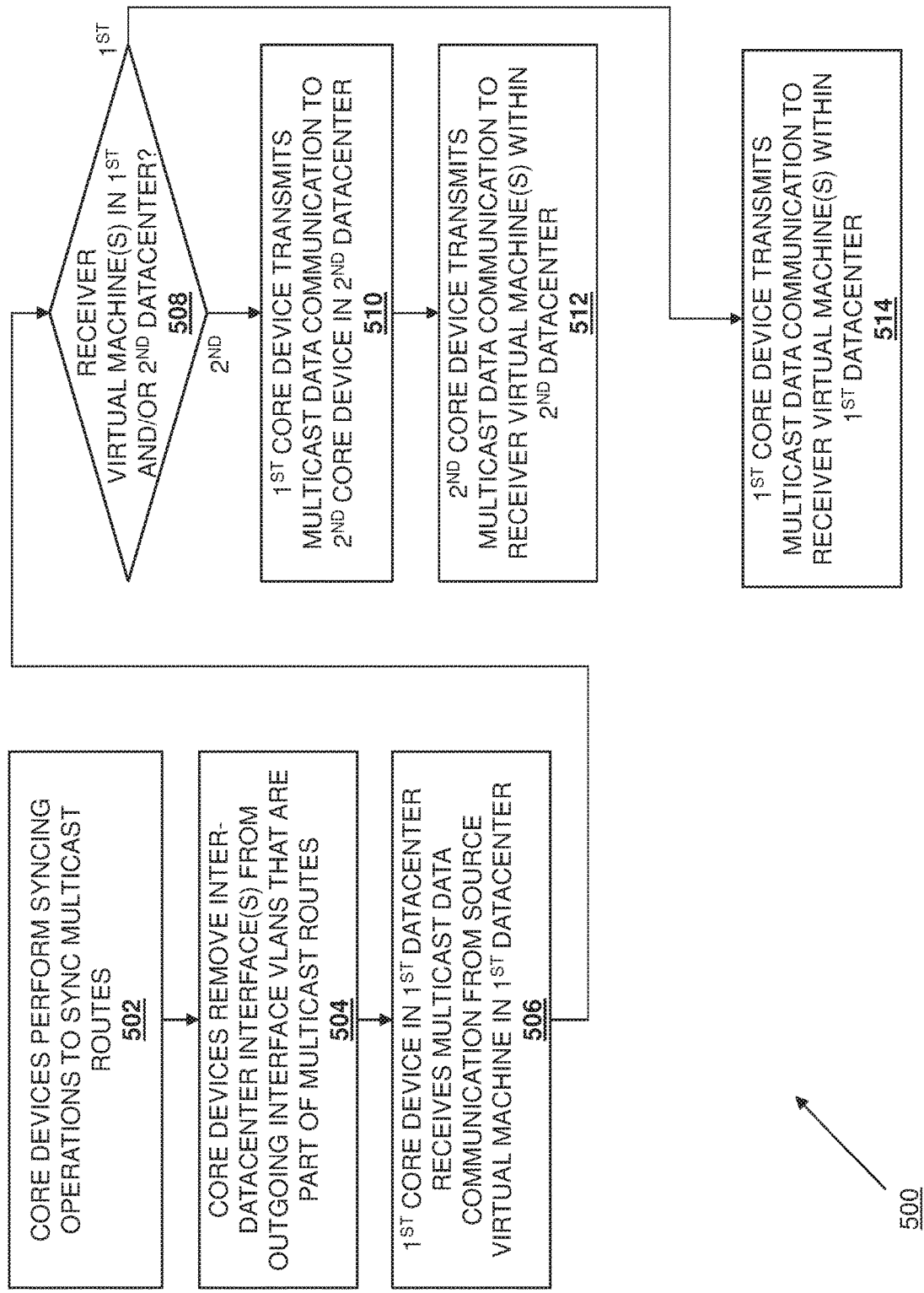
FIG. 5 is a flow chart illustrating an embodiment of a method for providing multicast communication in a multi-datacenter system.

Referring now to FIG. 5, an embodiment of a method 500 for providing multicast communication in a multi-datacenter system is illustrated. As discussed below, the systems and methods of the present disclosure provides multicast router devices across different datacenters that each act as designated routers to route their packets locally within their respective datacenters, which is achieved by syncing multicast routes across those multicast router devices. Furthermore, modified multicast route programming of the forwarding plane in the multicast router devices may be provided that avoids the sending of multiple copies of multicast packets over inter-datacenter links. For example, if inter-datacenter links on a core device are part of outgoing interface VLANs, then those inter-datacenter links may not be considered when forwarding packets out of the outgoing interface VLANs, which prevents traffic tromboning and the sending of multiple copies of a packet between datacenters, thus improving the utilization of the links between the datacenters.

Figure 6A:
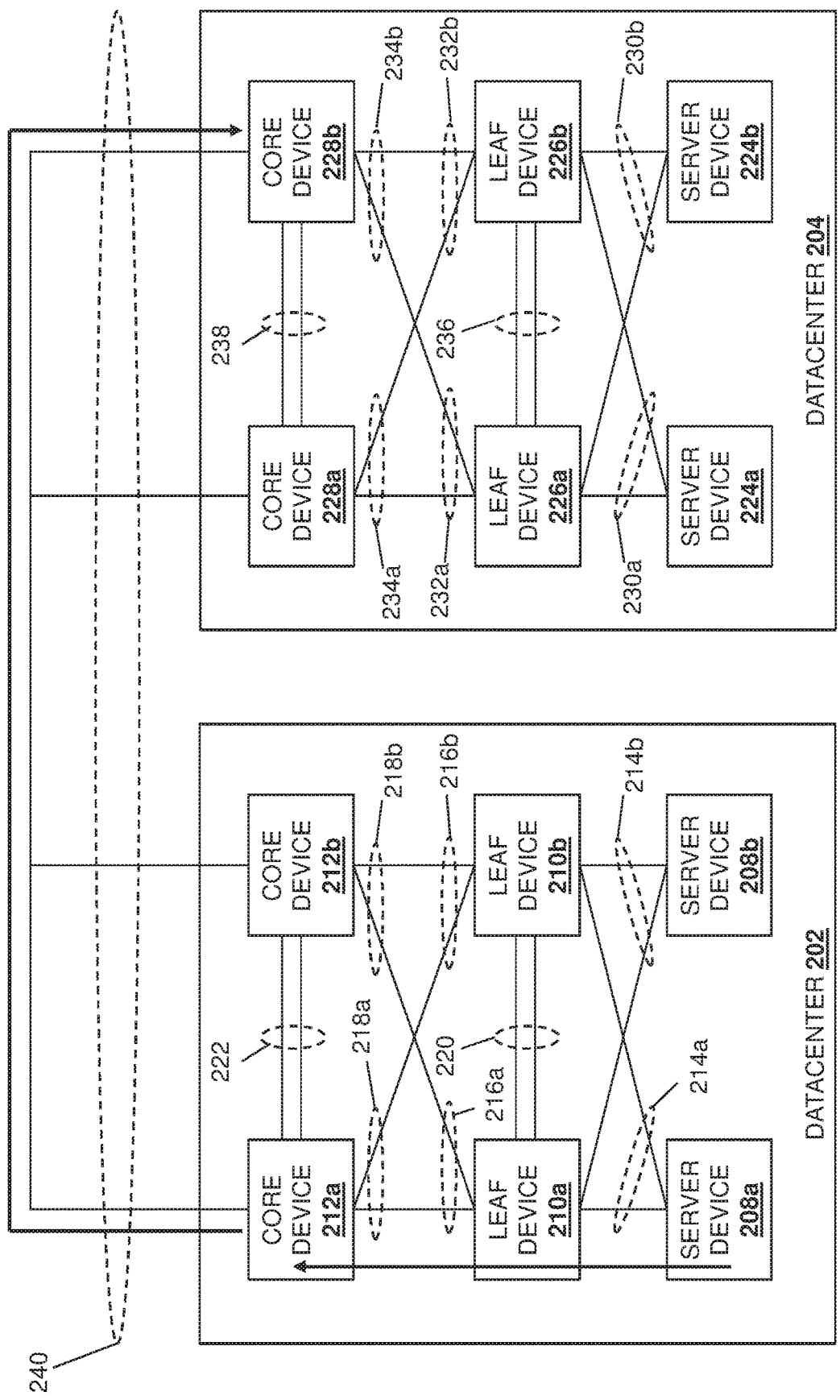
FIG. 6A is a schematic view illustrating an embodiment of a multicast communication sent in a conventional multi-datacenter system.
Figure 6B:
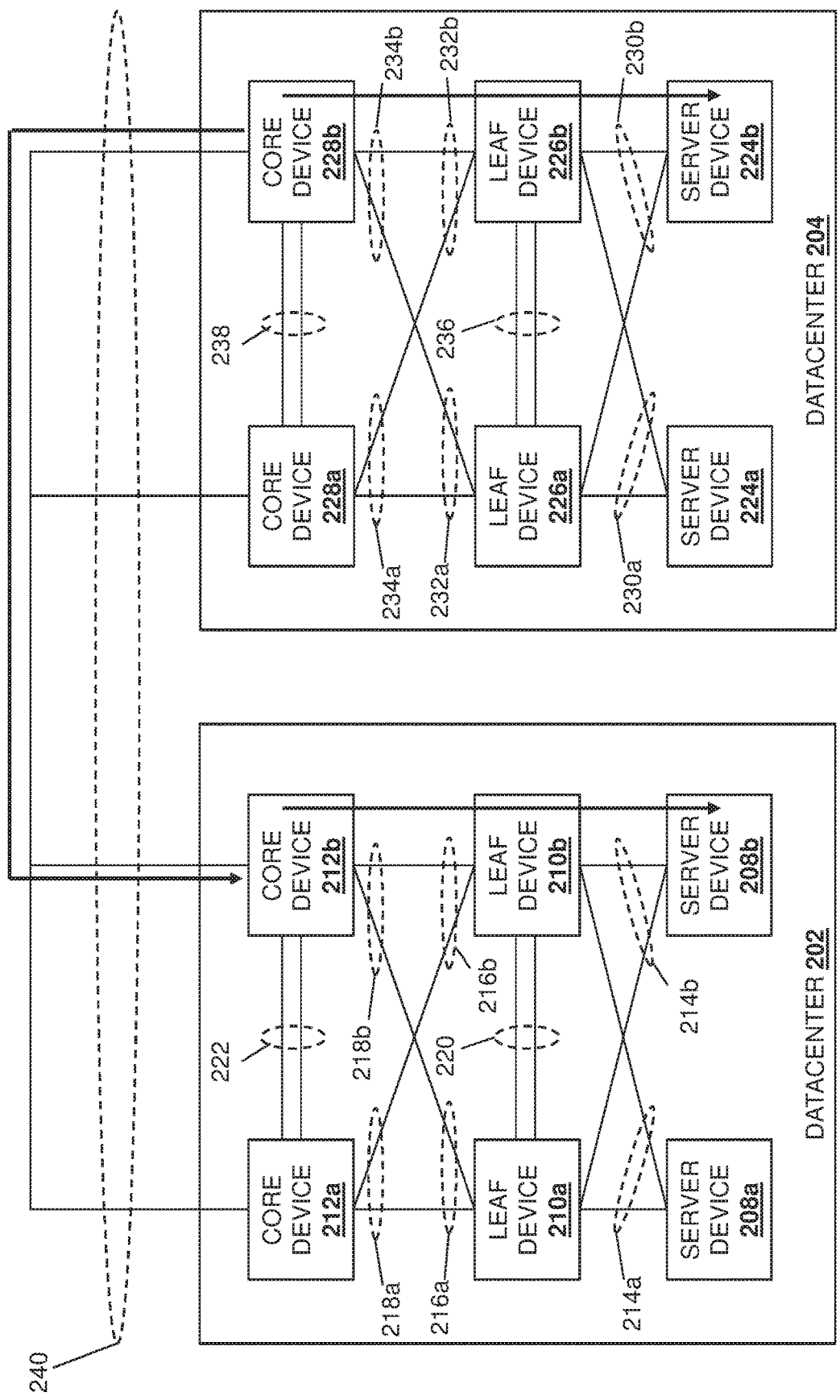
FIG. 6B is a schematic view illustrating an embodiment of the multicast communication sent in the conventional multi-datacenter system producing a traffic tromboning phenomenon.

To illustrate the improvements that the method 500 provides over conventional inter-datacenter multicast systems, examples of routing by such conventional inter-datacenter multicast systems is illustrated and described briefly below. With reference to FIGS. 6A and 6B, a source virtual machine may be provided on the server device 208a, with a first receiver virtual machine provided on the server device 208b and a second receiver virtual machine provided on the server device 224b. As such, the L2 domain is stretched across the network core (i.e., between the datacenters 202 and 204), and in this example the first hop router/designated router for the VLAN that includes the source virtual machine, as well as the last hop router/designated router for the first receiver virtual machine and the second receiver virtual machine, is provided by the core device 228b. As can be seen in FIG. 6A, a multicast data communication generated by the source virtual machine in the server device 208a may be sent to the leaf device 210a, and forwarded by the leaf device 210a to the core device 212a. That multicast data communication may then be forwarded by the core device 212a over the MLAG 240 (and between the datacenters 202 and 204) to the core device 228a (which is configured to act as the first hop router, last hop router, and designated router for the source virtual machine and first/second receiver virtual machines, as discussed above.)

As can be seen in FIG. 6B, the core device 228b will then replicate the multicast data communication, and send a first replicated multicast data communication to the leaf device 226b so that it is forwarded to the second receiver virtual machine in the server device 224b. However, the core device 228b will also send a second replicated multicast data communication over the MLAG 240 (and between the datacenters 202 and 204) to the core device 212b. The core device 212b will then forward the second replicated multicast data communication to the leaf device 210b so that it is forwarded to the first receiver virtual machine in the server device 208b. As such, a multicast data communication traverses the L2 network core/inter-datacenter link(s) twice (i.e. over the MLAG 240 between the datacenters 202 and 204) in order to reach the first receiver virtual machine, which is commonly referred to as "traffic tromboning", and increases latency in that multicast data communication, as well as the traffic load on the inter-datacenter MLAG.

Figure 7A:
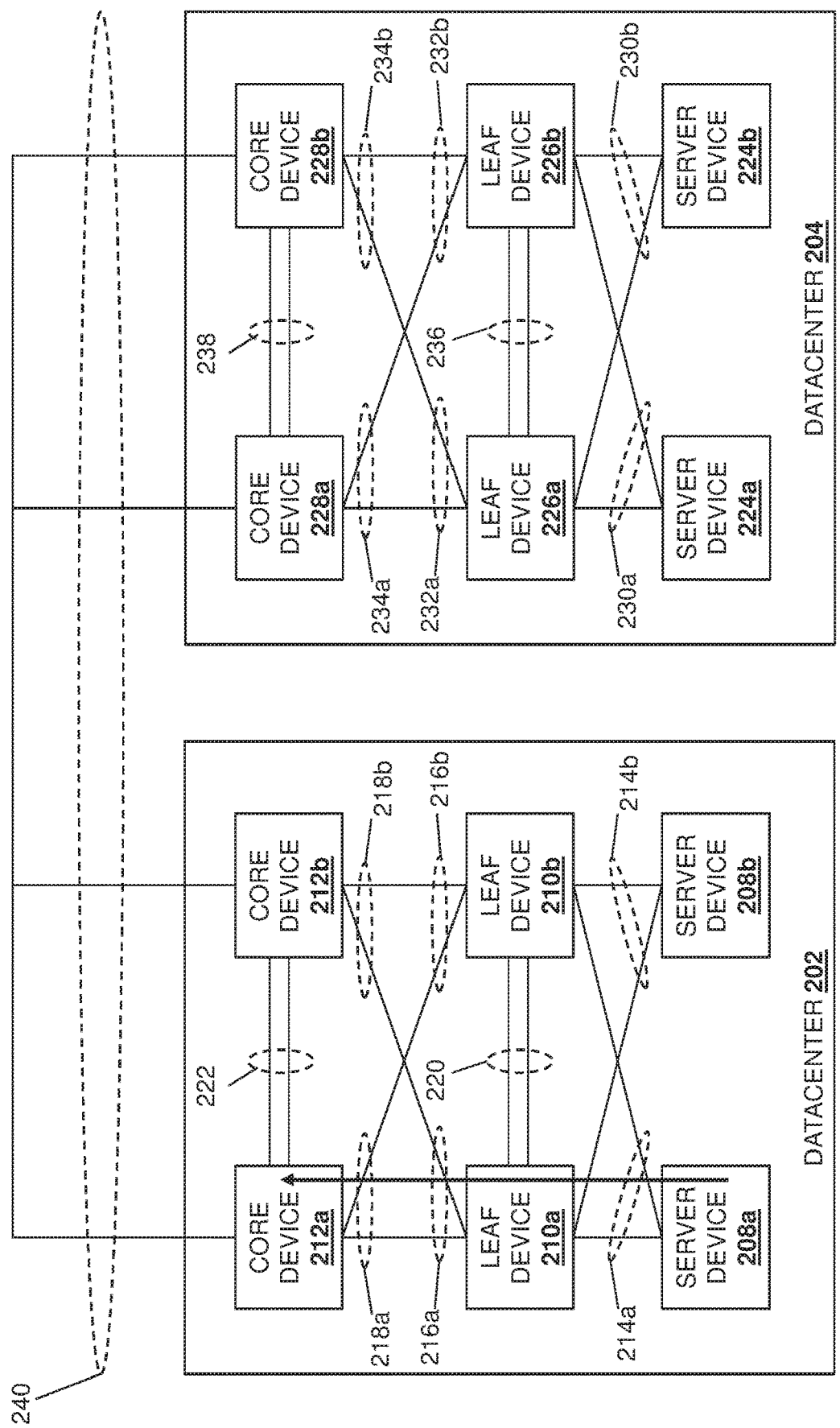
FIG. 7A is a schematic view illustrating an embodiment of a multicast communication sent in a conventional multi-datacenter system.
Figure 7B:
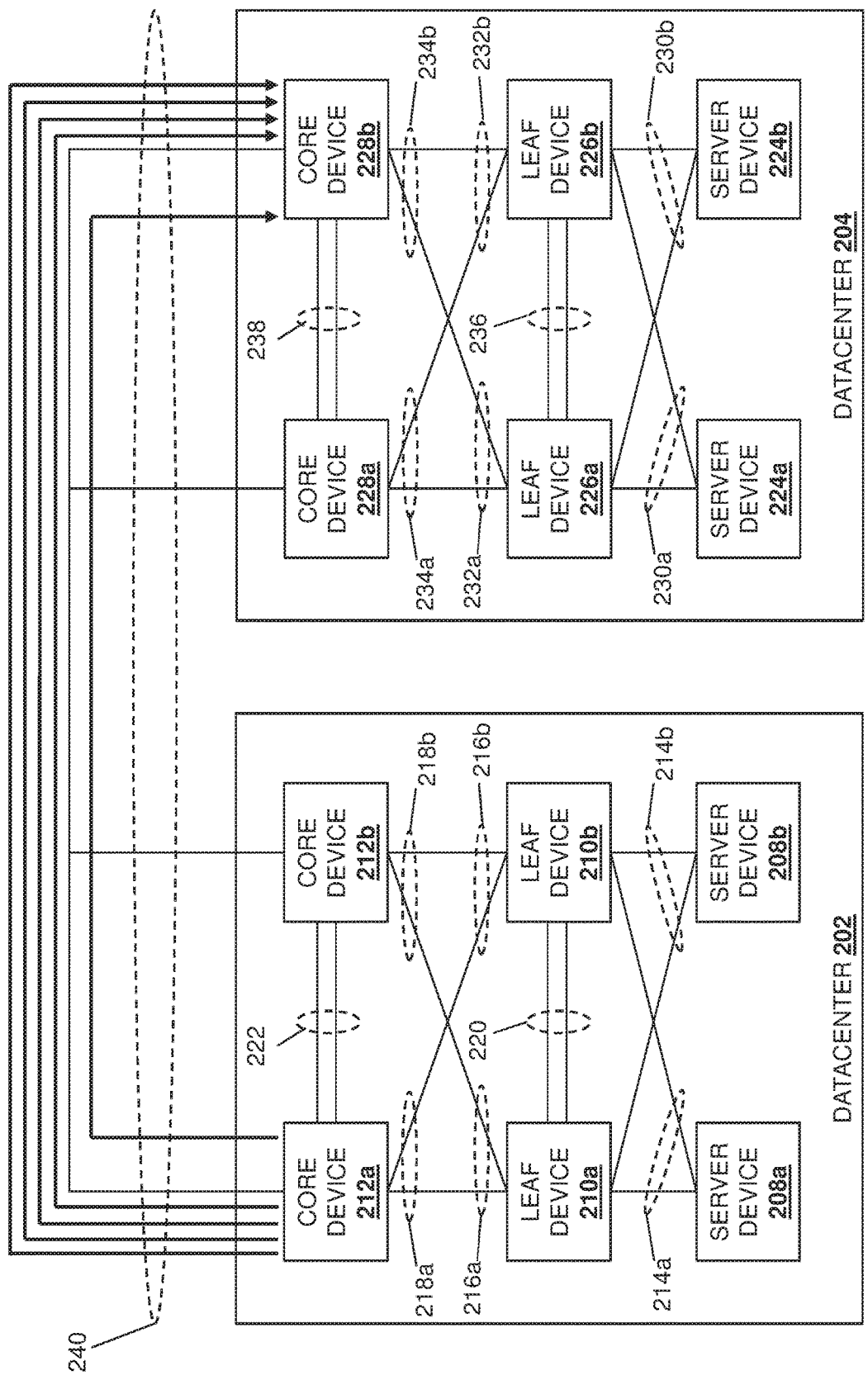
FIG. 7B is a schematic view illustrating an embodiment of the multicast communication sent in the conventional multi-datacenter system of FIG. 7B being replicated, and each replicated communication being sent over an L2 network between the datacenters.
Figure 7C:
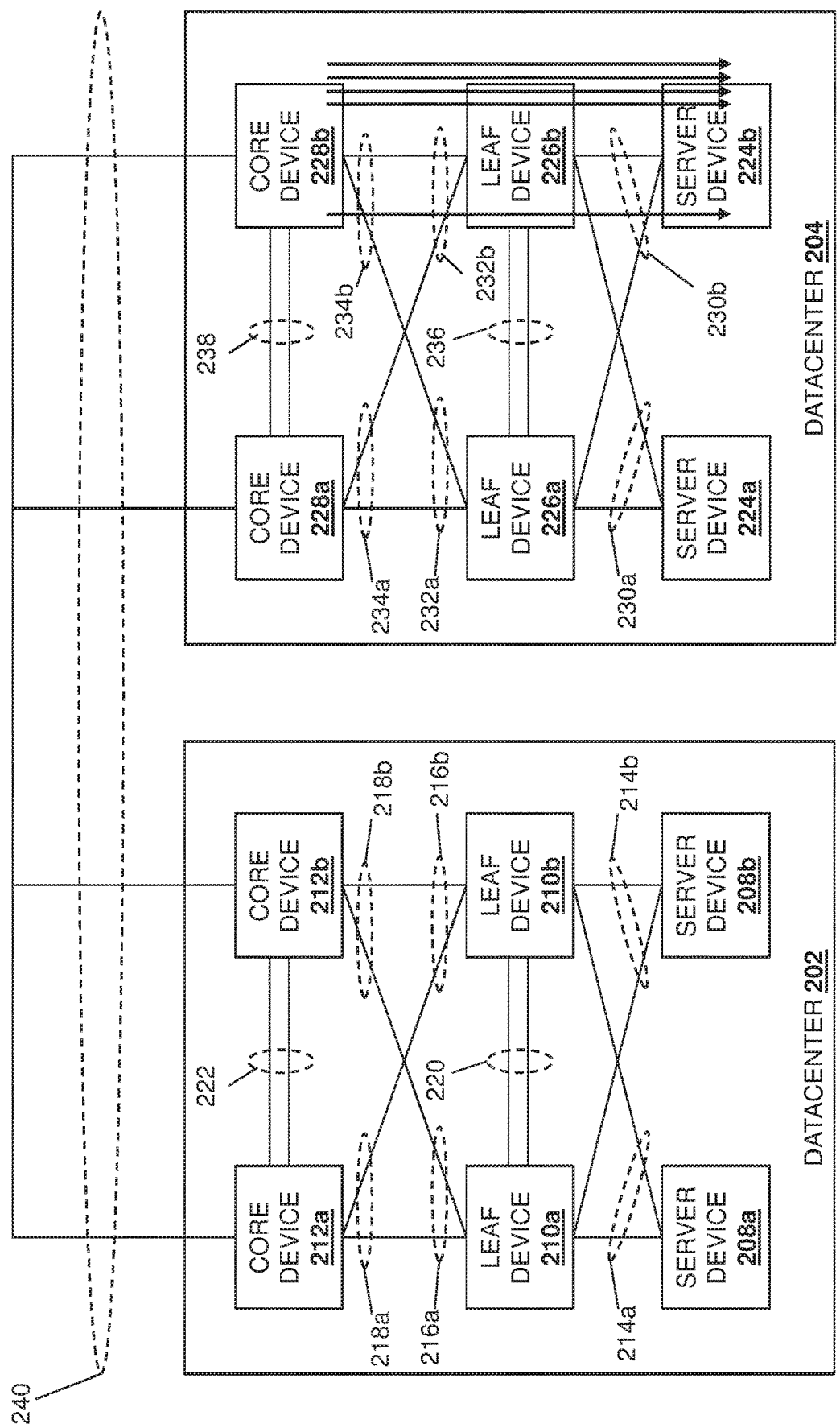
FIG. 7C is a schematic view illustrating an embodiment of the each replicated communication of FIG. 7B that were sent over the L2 network between the datacenters being delivered.

Furthermore, with reference to FIGS. 7A, 7B, and 7C, in addition to traffic tromboning, such conventional inter-datacenter multicast systems often provide for the sending of multiple copies of the same multicast packet across core links and between datacenters. For example, a source virtual machine may be provided on the server device 208a, with multiple receiver virtual machines provided on the server device 224b. In this example, the first hop router/designated router for the server device 208a is provided by the core device 212a, and the VLAN for the source virtual machine may be referred to as "VLAN 10". The core device 212a may include a multicast route with the VLAN 10 as its incoming interface (i.e., that includes the source virtual machine), and outgoing interface VLANs designated as "VLAN 20", "VLAN 30", "VLAN 40", and "VLAN 50" (i.e., that include the receiver virtual machines.) Finally, the core device 212a may also act as the last hop router/designated router/rendezvous point for the multicast route. As such, a multicast data communication generated by the source virtual machine in the server device 208a may be sent to the leaf device 210a, and forwarded by the leaf device 210a to the core device 212a, as illustrated in FIG. 7A. The core device 212a will then replicate that multicast data communication for each receiver virtual machine that is part of the outgoing interface VLANs, and each of those replicated multicast data communications may then be forwarded by the core device 212a over the MLAG 240 (and between the datacenters 202 and 204) to the core device 228a, as illustrated in FIG. 7B. FIG. 7C illustrates how each of the replicated multicast data communications are then sent by the core device 228b to the leaf device 226b, and forwarded by the leaf device 226b to the receiver virtual machines in the server device 224b. As such, multiple copies of the same multicast data communication are sent over the MLAG 240, increasing the utilization of the inter-datacenter bandwidth. As described below, the method 500 provides for the remediation of the issues illustrated in FIGS. 6A-B and 7A-C.

The method 500 begins at block 502 where core devices perform syncing operations to sync multicast routes. In an embodiment, at block 502, the routing engine 304 in each of the core devices 300 (e.g., the core devices 212a, 212b, 228a, and 228b) may operate to synchronize multicast routes stored in their respective routing databases 306 with each other (e.g., using their respective communication systems 308.) For example, when any multicast router device (provided by any of the core devices 212a, 212b, 228a, and 228b) learns a multicast route, that multicast router device may operate to synchronize that multicast route with the other multicast router devices (i.e., within and across the datacenters 202 and 204 via the communication systems 308). In a specific example, the synchronization of multicast routes at block 502 may be performed using Link Layer Discovery Protocol (LLDP) communications between the core devices 212a, 212b, 228a, and 228b and via the MLAG 240, although other synchronization techniques will fall within the scope of the present disclosure as well. While the synchronization at block 502 is illustrated and describes as being performed at the beginning of the method 500, one of skill in the art in possession of the present disclosure will recognize that the multicast route syncing of the present disclosure may be performed anytime during the method 500 (i.e., any time a new multicast route is learned by a multicast router device.)

The method 500 the proceeds to block 504 where the core devices remove inter-datacenter interface(s) from outgoing interface VLANs that are part of multicast routes. In an embodiment, at block 504, the routing engine 304 in each of the core devices 300 (e.g., the core devices 212a, 212b, 228a, and 228b) may operate to remove L2 interfaces that are part of the MLAG 240 from outgoing interface VLANs that are part of multicast routes that are programmed into their respective routing databases 306. For example, when multicast route programming is performed to add a multicast route to a routing database 306 in a multicast router device, that multicast route programming is modified (i.e., relative to conventional multicast route programming) to remove, ignore, or otherwise disregard inter-datacenter links that are part of outgoing interface VLANs such that those inter-datacenter links are not considered when forwarding packets out of outgoing interface VLANs. As such, the MLAG links between the core devices 212a, 212b, 228a, and 228b and the network 206 may be removed from the outgoing interface VLANs that are part of a multicast route at block 504. In a specific example, when a multicast route is installed on a forwarding engine of a multicast router device, Internet Group Management Protocol (IGMP) snooped ports may be considered for each outing interface in order to avoid unnecessary flooding of packets in the system. One of skill in the art in possession of the present disclosure will recognize that IGMP snooping operations allow the multicast router devices to know which of its ports are connected to receiver virtual machines, and then only flood those ports that are connected to receiver virtual machines. While the inter-datacenter interface removal at block 504 is illustrated and describes as being performed at the beginning of the method 500, one of skill in the art in possession of the present disclosure will recognize that the inter-datacenter interface removal of the present disclosure may be performed anytime during the method 500 (i.e., any time a new multicast route is programmed in a multicast router device.).

Figure 8A:
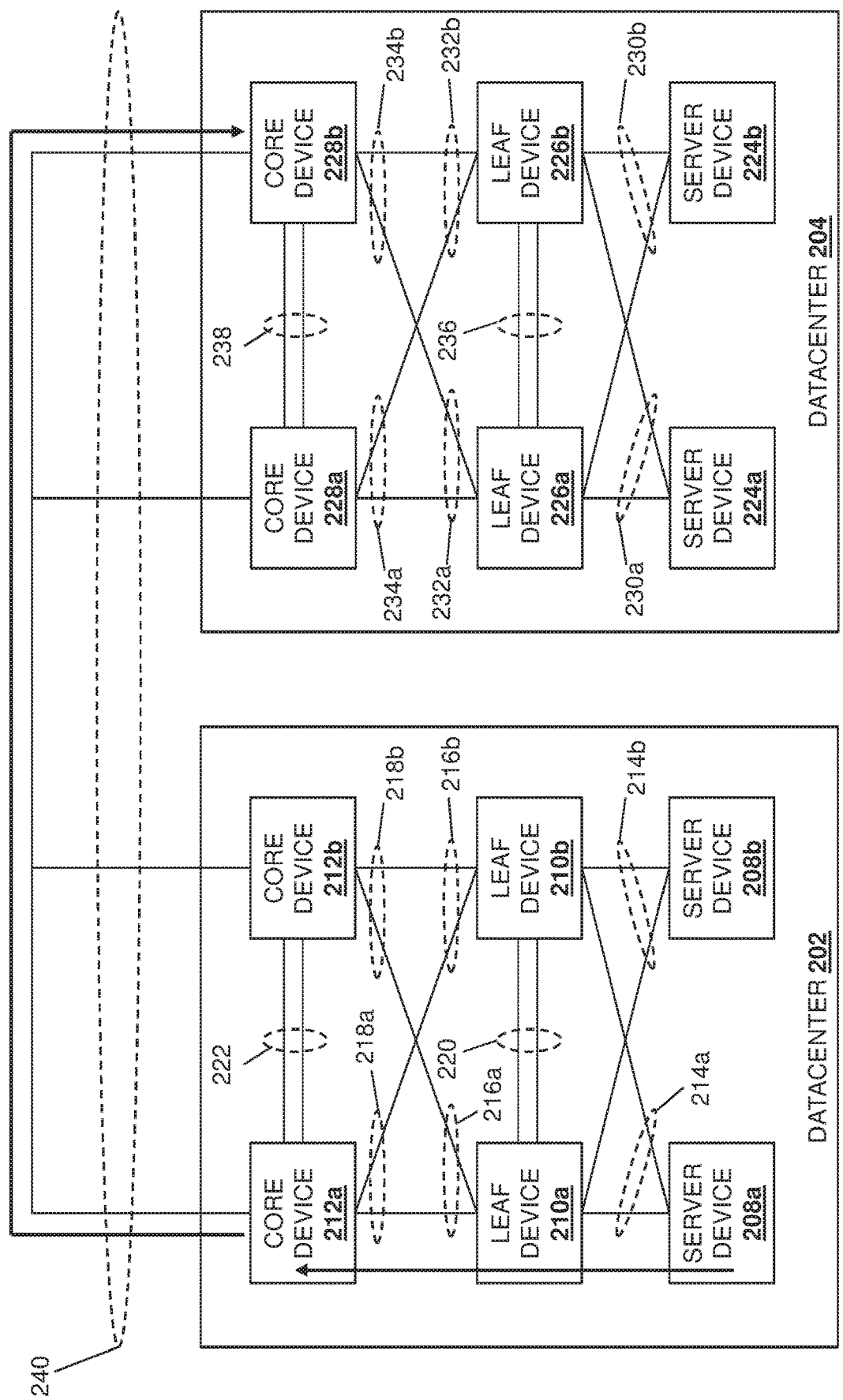
FIG. 8A is a schematic view illustrating an embodiment of a multicast communication sent in the multi-datacenter system of the present disclosure.

The method 500 the proceeds to block 506 where a first core device in a first datacenter receives multicast data communications from a source virtual machine in the first datacenter. In an embodiment, at block 506, the core device 212a in the datacenter 202 may receive a multicast data communication from a source virtual machine in the datacenter 202. With reference to FIG. 8A, a source virtual machine in the server 208a/400 (e.g., the virtual machine 404a) may generate a multicast data communication and send that multicast data communication to the leaf device 210a (e.g., via the communication system 406 and the MLAG 214a). The leaf device 210a will then forward that multicast data communication to the core device 212a (e.g., via the MLAG 216a.) Thus, at block 506, the routing engine 304 in the core device 212a/300 may receive the multicast data communication generated by the source virtual machine through its communication system 308.

The method 500 the proceeds to decision block 508 where the first core device determines whether receiver virtual machine(s) are in the first datacenter and/or second datacenter. In an embodiment, at decision block 508, the routing engine 304 in the core device 212a/300 may use the multicast routes stored in its routing database 306 (which include any multicast routes synchronized with other the other core devices 212b, 228a, and 228b) to determine whether the multicast data communication received at block 506 is directed to receiver virtual machines in the datacenter 202 and/or 204. As would be understood by one of skill in the art in possession of the present disclosure, the core device 212a may compare information in the multicast data communication (e.g., a VLAN upon which a packet was received, or a VLAN otherwise identified by that packet) with information included in the multicast routes in the routing database 306 (e.g., combinations of incoming interface VLANs and outgoing interface VLANs) to determine the location of receiver virtual machines on server devices in the datacenter(s) 202 and/or 204.

If, at decision block 508, it is determined that receiver virtual machines are in the second datacenter, the method 500 proceeds to block 510 where the first core device transmits the multicast data communication to a second core device in the second datacenter. As illustrated in FIG. 8A, in an embodiment of block 510, the routing engine 304 in the core device 212a/300 may determine that the multicast data communication received at block 506 is directed at a receiver virtual machine on the server device 224b in the datacenter 204 and, in response, may transmit a replicated multicast data communication through its communication system 308 to the core device 228b through the MLAG 240. As such, the routing engine 304 in the core device 228b/300 will receive the replicated multicast data communication via its communication system 308 at block 510.

The method 500 then proceeds to block 512 where the second core device transmits the multicast data communication to receiver virtual machine(s) within the second datacenter. In an embodiment, at block 512, the routing engine 304 in the core device 228b/300 will use the multicast routes stored in its routing database 306 (which include any multicast routes synchronized with other the other core devices 212b, 228a, and 228b) to determine that the multicast data communication received at block 510 should be forwarded to the receiver virtual machine(s) in the server device 224b. As would be understood by one of skill in the art in possession of the present disclosure, the routing engine 304 in the core device 228b/300 may compare information in the multicast data communication (e.g., a VLAN upon which a packet was received, or a VLAN otherwise identified by that packet) with information included in the multicast routes in the routing database 306 (e.g., combinations of incoming interface VLANs and outgoing interface VLANs) to determine the location of a receiver virtual machine on the server device 224b, and then may forward that multicast data communication to the leaf device 226b via its communication system 308 and through the MLAG 234b. The leaf device 226b may then forward that multicast data communication to the receiver virtual machine provided on the server device 224b. As such, a virtual machine in the server device 224b/400 (e.g., the virtual machine 404d) may receive the multicast data communication via the communication system 406.

One of skill in the art in possession of the present disclosure will recognize how the removal of inter-datacenter interfaces from outgoing interface VLANs that are part of multicast routes at block 504 will prevent the routing engine 304 in the core device 228b/300 from sending the multicast data communication back through the MLAG 240 to the core device 212b at block 512 (i.e., for forwarding through the leaf device 210b to the receiver virtual machine provided on the server device 208b.) In other words, while the multicast route in the core device 228b may include both receiver virtual machines provided by the server device 224b and the server device 208b (i.e., as in the example below), the inter-datacenter interface between the core device 228b and the MLAG 240 may have been removed from outgoing interface VLANs that are part of that multicast route, which will prevent the routing engine 304 in the core device 228b/300 from sending the multicast data communication back through the MLAG 240 to the core device 212b. As such, at block 512 the routing engine 304 in the core device 228b/300 will only transmit the multicast data communication to receiver virtual machines provided on server devices in the datacenter 204.

Figure 8B:
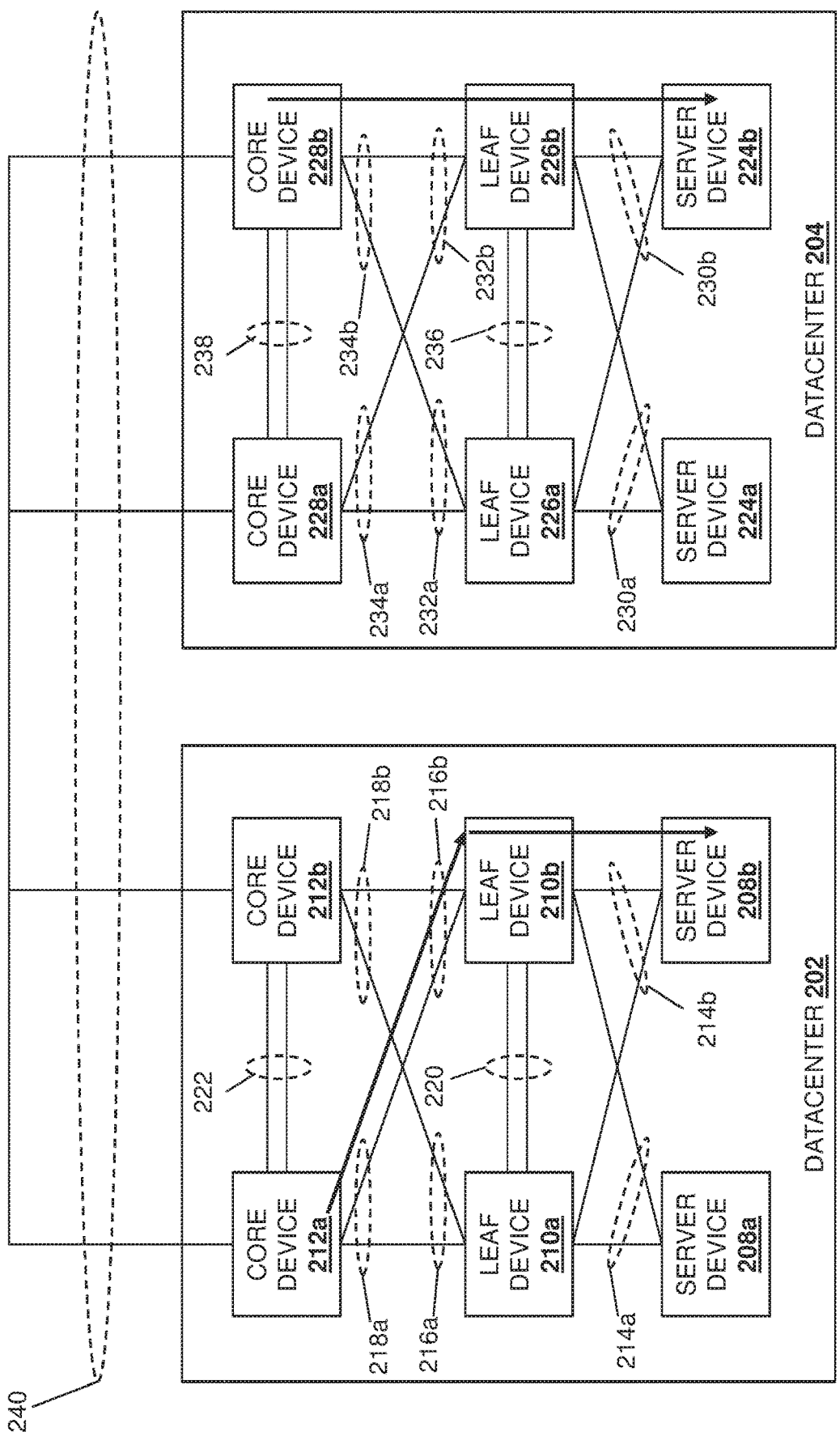
FIG. 8B is a schematic view illustrating an embodiment of the multicast communication of FIG. 6A being delivered according to the teachings of the present disclosure to prevent a traffic tromboning phenomenon.

If, at decision block 508, it is determined that receiver virtual machines are in the first datacenter, the method 500 proceeds to block 514 where the first core device transmits the multicast data communication to receiver virtual machine(s) in the first datacenter. As illustrated in FIG. 8B, in an embodiment of block 514, the routing engine 304 in the core device 212a/300 may determine that the multicast data communication received at block 506 is directed at a receiver virtual machine on the server device 208b in the datacenter 202 and, in response, may transmit a multicast data communication through its communication system 308 to the leaf device 210b via the MLAG 218a, and the leaf device 210b will forward that multicast data communication to the receiver virtual machine in the server device 208b. As would be understood by one of skill in the art in possession of the present disclosure, the routing engine 304 in the core device 212a/300 may compare information in the multicast data communication (e.g., a VLAN upon which a packet was received, or a VLAN otherwise identified by that packet) with information included in the multicast routes in the routing database 306 (e.g., combinations of incoming interface VLANs and outgoing interface VLANs) to determine the location of a receiver virtual machine on the server device 208b, and then may forward that multicast data communication to the leaf device 210b via its communication system 308 and through the MLAG 218a. The leaf device 226b may then forward that multicast data communication to the receiver virtual machine provided on the server device 208b. As such, a virtual machine in the server device 208b/400 (e.g., the virtual machine 404c) may receive the multicast data communication via the communication system 406. While blocks 510 and 512 are illustrated and described as occurring separately from block 514, one of skill in the art in possession of the present disclosure will recognize that only one of those blocks may be executed for a given performance of the method 500, or the execution of those blocks may occur at the same time (or in a different order), such that the multicast data communication is transmitted to each designated receiver virtual machine in the datacenters 202 and 204.

Figure 9:
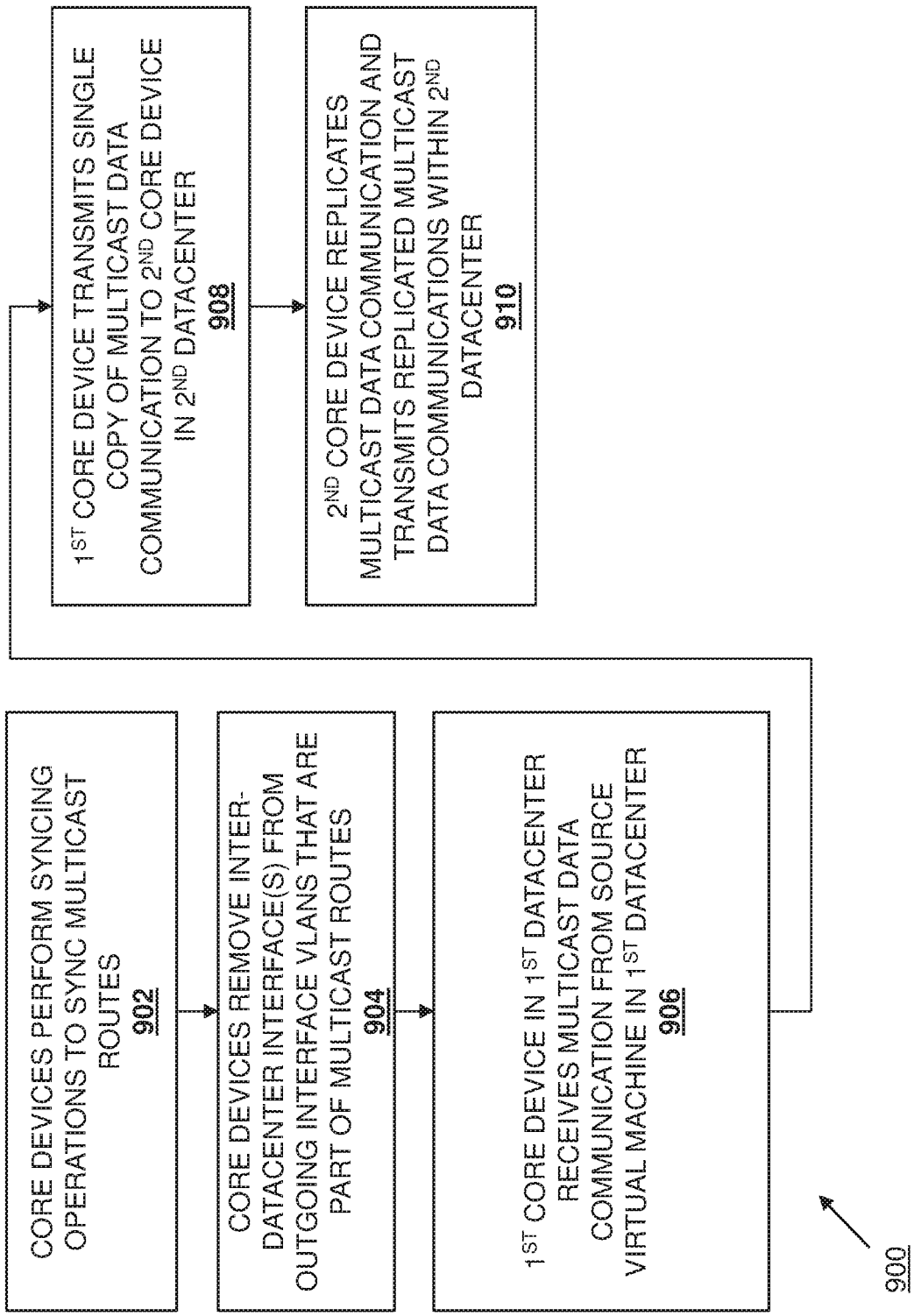
FIG. 9 is a flow chart illustrating an embodiment of a method for providing multicast communication in a multi-datacenter system.

Referring now to FIG. 9, an embodiment of a method 900 for providing multicast communication in a multi-datacenter system is illustrated. The method 900 begins at block 902 where core devices perform syncing operations to sync multicast routes. In an embodiment, the syncing operations performed at block 902 by the core devices 212a, 212b, 228a, and 228b to sync multicast routes may be substantially similar to those described above with regard to block 502. The method 900 the proceeds to block 904 where the core devices remove inter-datacenter interface(s) from outgoing interface VLANs that are part of multicast routes. In an embodiment, the removal of inter-datacenter interface(s) from outgoing interface VLANs that are part of a multicast route may be performed at block 904 by the core devices 212*a*, 212*b*, 228*a*, and 228*b* in substantially the same manner as described above with regard to block 504. As such, one of skill in the art in possession of the present disclosure will recognize that the synchronization of multicast routes between the core devices 212*a*, 212*b*, 228*a*, and 228*b*, and their removal of inter-datacenter interface(s) from outgoing interface VLANs that are part of multicast routes, may provide for both the benefits described above with regard to the method 500, as well as the benefits described below with regard to the method 900.

Figure 10A:
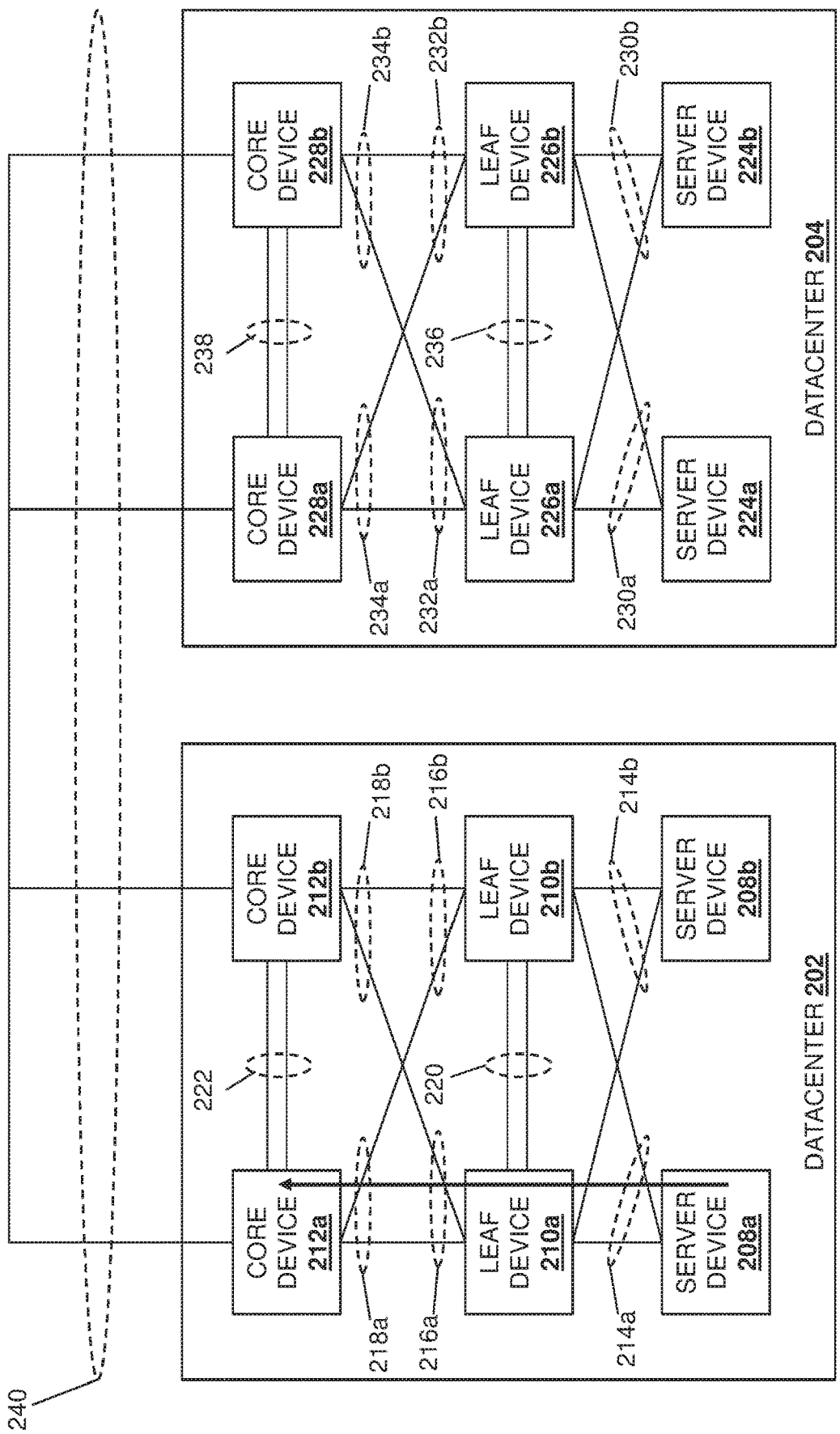
FIG. 10A is a schematic view illustrating an embodiment of a multicast communication sent in the multi-datacenter system of the present disclosure.

The method 900 the proceeds to block 906 where a first core device in a first datacenter receives multicast data communications from a source virtual machine in the first datacenter. In an embodiment, at block 906, the core device 212*a* in the datacenter 202 may receive a multicast data communication from a source virtual machine in the datacenter 202. With reference to FIG. 10A, a source virtual machine in the server 208*a*/400 (e.g., the virtual machine 404*a*) may generate a multicast data communication and send that multicast data communication to the leaf device 210*a* (e.g., via the communication system 406 and the MLAG 214*a*). The leaf device 210*a* will then forward that multicast data communication to the core device 212*a* (e.g., via the MLAG 216*a*.) Thus, at block 506, the routing engine 304 in the core device 212*a*/300 may receive the multicast data communication generated by the source virtual machine through its communication system 308.

In the example discussed below, the multicast data communication received by the core device 212*a* at block 906 was sent via an incoming interface VLAN for a multicast route that includes outgoing interface VLAN(s) with receiver virtual machines in the datacenter 204. For example, the source virtual machine in the server 208*a*/400 (e.g., the virtual machine 404*a*) that generated the multicast data communication received at block 906 may be part of "VLAN 10", and the core device 212*a*/300 may include a multicast route in its routing database 306 with the VLAN 10 as its incoming interface, and outgoing interface VLANs designated as "VLAN 20", "VLAN 30", "VLAN 40", and "VLAN 50", each of which includes a receiver virtual machine provided on the server device 224*b* in the datacenter 204. Furthermore, the core device 212*a* may act as the first hop router/designated router for the server device 208*a*, as well as the last hop router/designated router/rendezvous point for the multicast route and receiver virtual machines. However, while a specific multicast route configuration has been illustrated and described, one of skill in the art in possession of the present disclosure will recognize that other multicast route configurations will benefit from the teachings of the present disclosure and thus will fall within its scope as well.

Figure 10B:
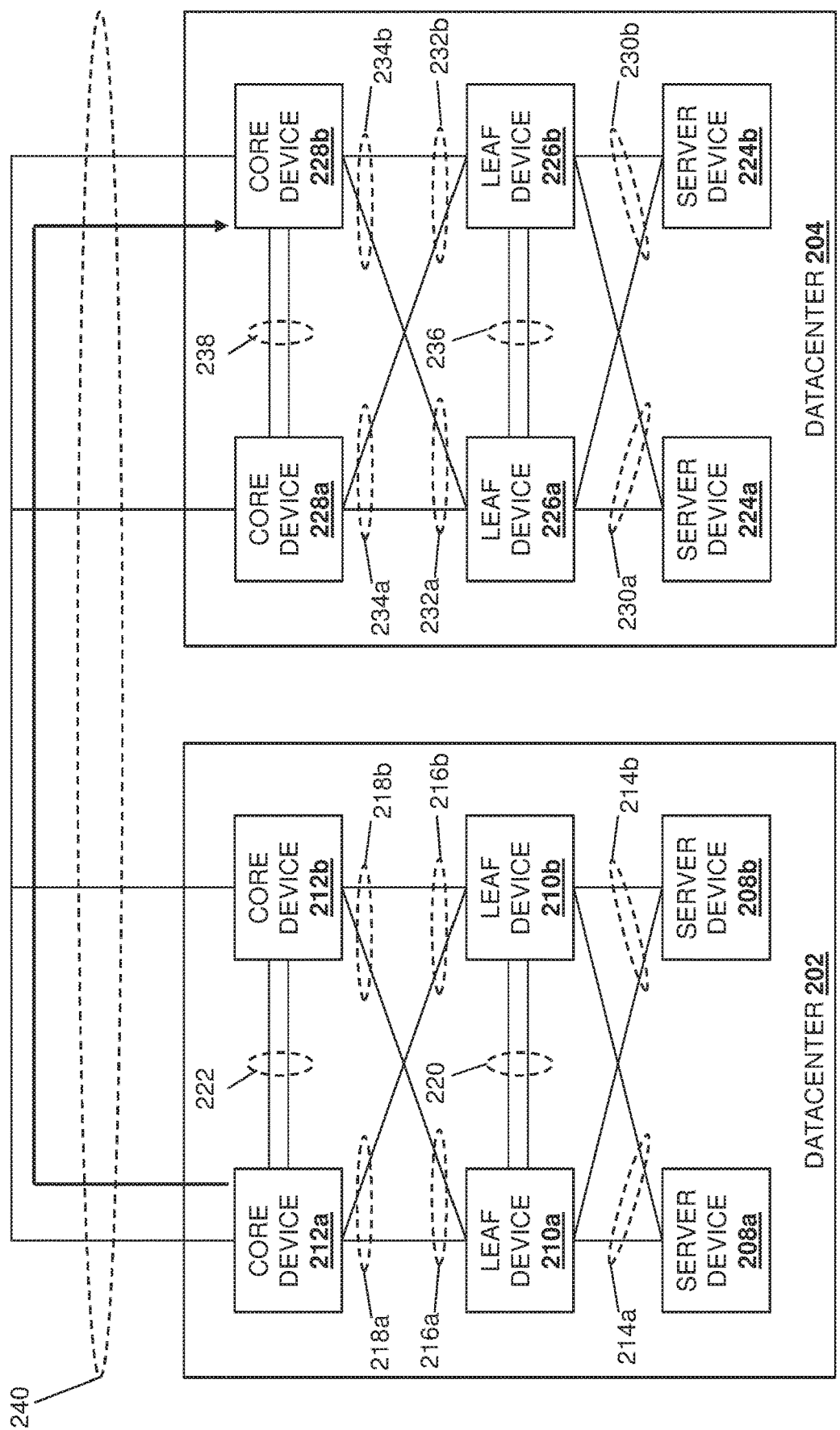
FIG. 10B is a schematic view illustrating an embodiment of the multicast communication sent over the L2 network between the datacenters in the multi-datacenter system of the present disclosure.
Figure 10C:
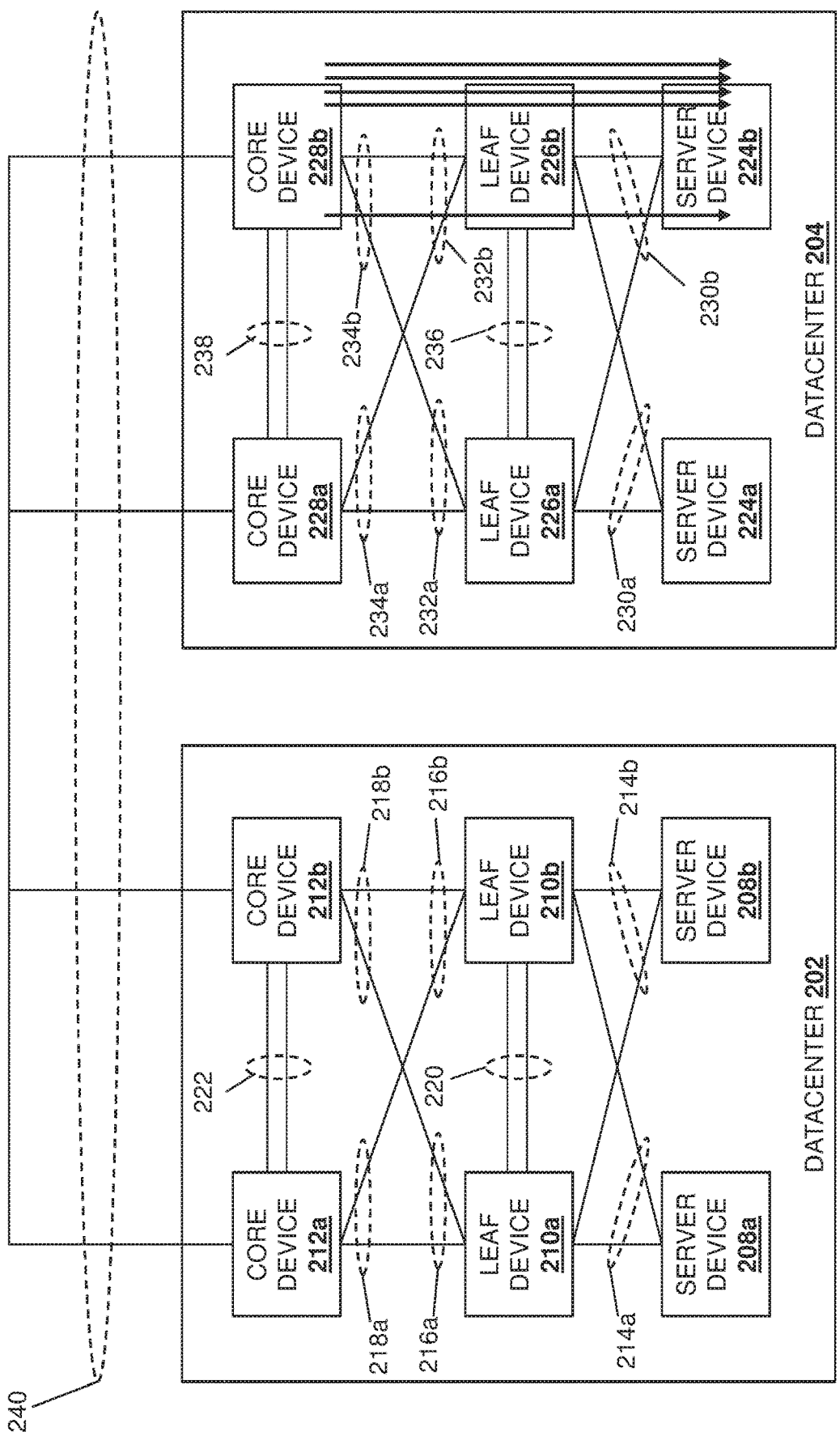
FIG. 10C is a schematic view illustrating an embodiment of the multicast communication of FIG. 9B being replicated and delivered within a datacenter that includes the receivers of those replicated communications.

The method 900 then proceeds to block 910 where the first core device transmits a single copy of the multicast data communication to a second core device in the second datacenter. In an embodiment, at block 910, the routing engine 304 in the core device 212*a* may reference its routing database 306 to identify that the multicast data communication received from the source virtual machine that is part of VLAN 10 is to be delivered to the receiver virtual machines that are part of VLANs 20, 30, 40, and 50. Furthermore, the routing engine 304 in the core device 212*a* may determine that those receiver virtual machines are each located in the server device 224*b* in the datacenter 204. However, because of the removal of inter-datacenter interfaces from outgoing interface VLANs that are part of a multicast route at block 904, the routing engine 304 in the core device 212*a* will only forward a single copy of the multicast data communication (i.e., the multicast data communication received from the source virtual machine that is part of VLAN 10) via its communication system 308 and through the MLAG 240 to the core device 228*b*, as illustrated in FIG. 10B. As such, at block 910 the routing engine 304 in the core device 228*b* may receive the single copy of the multicast data communication via is communication system 308. One of skill in the art in possession of the present disclosure will recognize that the forwarding of the single copy of the multicast data communication at block 910 conserves bandwidth on the MLAG link(s) between the datacenters 202 and 204 relative to conventional systems that would replicate the multicast data communication, and send each of the replicated multicast data communications through the MLAG 240 between the datacenters 202 and 204, as discussed above with reference to FIGS. 7A-7C.

The method 900 then proceeds to block 912 where the second core device replicates the multicast data communication and transmits the replicated multicast data communications within the second datacenter. In an embodiment, at block 912, the routing engine 304 in the core device 228*b* may determine that the multicast data communication should be replicated and transmitted to each of the receiver virtual machines provided by the server device 224*b*. For example, the routing engine 304 in the core device 228*b* may reference the multicast routes in its routing database 306 (which were synchronized with the other core devices 212*a*, 212*b*, and 228*a* at block 902) to identify the multicast route with the incoming interface VLAN 10 and the outgoing interface VLANs 20, 30, 40, and 50, and determine that the multicast data communication was received via the VLAN 10 and should be replicated and forwarded to receiver virtual machines that are part of VLANs 20, 30, 40, and 50 (and provided by the server device 224*b*.) As such, at block 912, the routing engine 304 in the core device 228*b* may replicate the multicast data communication, and transmit each of the replicated multicast data communications to the leaf device 226*b* (e.g., via its communication system 308 and through the MLAG 234*b*), and the leaf device 226*b* will then forwards those replicated multicast data communications to the receiver virtual machines provided on the server device 224*b*.

Thus, systems and methods have been described that provides multicast router devices across different datacenters that are each configured to sync their multicast routes with each other in order to enable each of those multicast router devices to act as designated routers to route their packets locally within their respective datacenters. Furthermore, modified multicast route programming of the forwarding plane in those multicast router devices may be provided that avoids the sending of multiple copies of multicast packets over inter-datacenter links by removing inter-datacenter links that are part of outgoing interface VLANs from consideration when forwarding packets out of the outgoing interface VLANs, which prevents traffic tromboning and sending of multiple copies of a packet between datacenters, thus improving the utilization of the links between the datacenters.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An inter-datacenter multicast system, comprising:
   a first datacenter that includes at least one first server device;
   a second datacenter that includes at least one second server device;
   a first multicast router device that is located in the first datacenter, that is coupled to the at least one first server device, and that includes at least one first multicast router interface that provides a link to the second datacenter; and
   a second multicast router device that is located in the second datacenter, that is coupled to the at least one second server device, and that includes at least one second multicast router interface that provides a link to the first datacenter,
   wherein the first multicast router device is configured to:
      sync multicast routes with the second multicast router device; and
      remove each at least one first multicast router interface from outgoing interface Virtual Local Area Networks (VLANs) that are part of a multicast route, and
   wherein the second multicast router device is configured to:
      sync multicast routes with the first multicast router device, wherein the syncing of multicast routes between the first multicast router device and the second multicast router device configures each of the first multicast router device and the second multicast router device to act as respective designated routers; and
      remove each at least one second multicast router interface from outgoing interface Virtual Local Area Networks (VLANs) that are part of a multicast route, and
   wherein the first multicast router device is configured to:
      receive a first multicast data communication from a source virtual machine that is provided on the at least one first server device;
      determine, using the multicast routes that were synced with the second multicast router device, that a first receiver virtual machine to which the first multicast data communication should be transmitted is provided on the at least one first server device; and
      transmit, acting as the designated router and in response to determining that the first receiver virtual machine is provided on the at least one first server device, the first multicast data communication to the first receiver virtual machine within the first datacenter.

2. The system of claim 1, wherein the first multicast router device is configured to:
   determine, using the multicast routes that were synced with the second multicast router device, that a second receiver virtual machine for the first multicast data communication is provided on the at least one second server device; and
   transmit, in response to determining that the second receiver virtual machine is provided on the at least one second server device, the first multicast data communication to the second multicast router device in the second datacenter for forwarding to the second receiver virtual machine.

3. The system of claim 2, wherein the second multicast router device is prevented from transmitting the first multicast data communication back to the first multicast router device in the first datacenter for forwarding to the first receiver virtual machine due to the removal of each at least one second multicast router interface from outgoing interface VLANs that are part of a multicast route.

4. The system of claim 1, wherein the first multicast router device is configured to:
   receive a second multicast data communication from a source virtual machine that is provided on the at least one first server device, wherein the second multicast data communication is sent via an incoming interface VLAN for a multicast route that includes outgoing interface VLANs including a plurality of receiver virtual machines for the second multicast data communication that are provided on the at least one second server device; and
   transmit a single copy of the second multicast data communication to the second multicast router device in the second datacenter, wherein the first multicast router device is prevented from transmitting multiple copies of the second multicast data communication to the second multicast router device in the second datacenter due to the removal of each at least one first multicast router interface from outgoing interface VLANs that are part of a multicast route.

5. An Information Handling System (IHS), comprising:
   a communication system;
   a processing system that is coupled to the communication system; and
   a memory system that is coupled to the processing system and that includes instructions that, when executed by the processing system, cause the processing system to provide a routing engine that is included in a first datacenter and that is configured to:
      sync multicast routes with a multicast router device in a second datacenter that is coupled to the communication system, wherein the syncing of multicast routes between the routing engine and the multicast router device configures each of the routing engine and the multicast router device to act as respective designated routers;
      remove interfaces in the communication system that provide a link to the second datacenter from outgoing interface Virtual Local Area Networks (VLANs) that are part of a multicast route; and
      receive, through the communication system from the multicast router device in the second datacenter, a first multicast data communication, wherein the routing engine is prevented from transmitting the first multicast data communication back to the multicast router device in the second datacenter due to the removal of each interface in the communication system that provides a link to the second datacenter from outgoing interface VLANs that are part of a multicast route.

6. The IHS of claim 5, wherein the routing engine configured to:
   receive, via the communication system, a second multicast data communication from a source virtual machine that is provided on at least one first server device in the first datacenter;
   determine, using the multicast routes that were synced with the multicast router device, that a first receiver virtual machine for the second multicast data communication is provided on the at least one first server device in the first datacenter; and transmit, acting as the designated router and in response to determining that the first receiver virtual machine is provided on the at least one first server device, the second multicast data communication to the first receiver virtual machine within the first datacenter.

7. The IHS of claim 6, wherein the routing engine is configured to:

determine, using the multicast routes that were synced with the multicast router device, that a second receiver virtual machine for the second multicast data communication is provided on at least one second server device in the second datacenter; and transmit, in response to determining that the second receiver virtual machine is provided on the at least one second server device, the second multicast data communication to the multicast router device in the second datacenter for forwarding to the second receiver virtual machine.

8. The IHS of claim 5, wherein the routing engine is configured to:

receive a second multicast data communication from a source virtual machine that is provided on at least one first server device in the first datacenter, wherein the second multicast data communication is sent via an incoming interface VLAN for a multicast route that includes outgoing interface VLANs including a plurality of receiver virtual machines for the second multicast data communication that are provided on at least one second server device in the second datacenter; and transmit a single copy of the second multicast data communication to the multicast router device in the second datacenter, wherein the routing engine is prevented from transmitting multiple copies of the second multicast data communication to the multicast router device in the second datacenter due to the removal of each interface in the communication system that provide a link to the second datacenter from outgoing interface VLANs that are part of a multicast route.

9. The IHS of claim 5, wherein the routing engine is configured to:

perform, subsequent to syncing the multicast routes with the multicast router device in the second datacenter, a snooping operation for each outgoing interface VLAN in the multicast routes to identify at least one server device that is connected to an interface in the communication system and that includes at least one receiver virtual machine identified by the multicast routes.

10. The IHS of claim 9, wherein the routing engine is configured to:

receive a second multicast data communication that is associated with a first multicast route; and flood, based on the snooping operations, the second multicast data communication through only interfaces in the communication system that are identified as connected to server devices including receiver virtual machines identified by the first multicast route.

11. A method for providing multicast communications in a multi-datacenter system, comprising:

syncing, by a first multicast router device that is located in a first datacenter, multicast routes with a second multicast router device that is located in a second datacenter, wherein the syncing of multicast routes between the first multicast router device and the second multicast router device configures each of the first multicast router device and the second multicast router device to act as respective designated routers;

removing, by the first multicast router device, each interface that provides a link to the second datacenter from outgoing interface Virtual Local Area Networks (VLANs) that are part of a multicast route; and performing, by the first multicast router device subsequent to syncing the multicast routes with the second multicast router device in the second datacenter, a snooping operation for each outgoing interface VLAN in the multicast routes to identify at least one server device that is connected to an interface on the first multicast router device and that includes at least one receiver virtual machine identified by the multicast routes.

12. The method of claim 11, further comprising:

receiving, by the first multicast router device, a multicast data communication from a source virtual machine that is provided on at least one first server device in the first datacenter;

determining, by the first multicast router device using the multicast routes that were synced with the second multicast router device, that a first receiver virtual machine for the multicast data communication is provided on the at least one first server device in the first datacenter; and transmitting, by the first multicast router device acting as the designated router and in response to determining that the first receiver virtual machine is provided on the at least one first server device, the multicast data communication to the first receiver virtual machine within the first datacenter.

13. The method of claim 12, further comprising:

determining, by the first multicast router device using the multicast routes that were synced with the second multicast router device, that a second receiver virtual machine for the multicast data communication is provided on at least one second server device in the second datacenter; and transmitting, by the first multicast router device in response to determining that the second receiver virtual machine is provided on the at least one second server device, the multicast data communication to the second multicast router device in the second datacenter for forwarding to the second receiver virtual machine.

14. The method of claim 11, further comprising:

receiving, by the first multicast router device from the second multicast router device in the second datacenter, a multicast data communication, wherein the first multicast router device is prevented from transmitting the multicast data communication back to the second multicast router device in the second datacenter due to the removal of each interface that provides a link to the second datacenter from outgoing interface VLANs that are part of a multicast route.

15. The method of claim 11, further comprising:

receiving, by the first multicast router device, a multicast data communication from a source virtual machine that is provided on at least one first server device in the first datacenter, wherein the multicast data communication is sent via an incoming interface VLAN for a multicast route that includes outgoing interface VLANs including a plurality of receiver virtual machines for the multicast data communication that are provided on at least one second server device in the second datacenter; and transmitting, by the first multicast router device, a single copy of the multicast data communication to the second multicast router device in the second datacenter, wherein the first multicast router device is prevented from transmitting multiple copies of the multicast data communication to the second multicast router device in the second datacenter due to the removal of each interface that provides a link to the second datacenter from outgoing interface VLANs that are part of a multicast route.

16. The method of claim 11, further comprising:

receiving, by the first multicast router device, a multicast data communication that is associated with a first multicast route; and flooding, by the first multicast router device based on the snooping operations, the multicast data communication through only interfaces on the first multicast router device that are identified as connected to server devices including receiver virtual machines identified by the first multicast route.

17. A method for providing multicast communications in a multi-datacenter system, comprising:

syncing, by a first multicast router device that is located in a first datacenter, multicast routes with a second multicast router device that is located in a second datacenter, wherein the syncing of multicast routes between the first multicast router device and the second multicast router device configures each of the first multicast router device and the second multicast router device to act as respective designated routers;

removing, by the first multicast router device, each interface that provides a link to the second datacenter from outgoing interface Virtual Local Area Networks (VLANs) that are part of a multicast route; and receiving, by the first multicast router device, a multicast data communication from a source virtual machine that is provided on at least one first server device in the first datacenter, wherein the multicast data communication is sent via an incoming interface VLAN for a multicast route that includes outgoing interface VLANs including a plurality of receiver virtual machines for the multicast data communication that are provided on at least one second server device in the second datacenter; and transmitting, by the first multicast router device, a single copy of the multicast data communication to the second multicast router device in the second datacenter, wherein the first multicast router device is prevented from transmitting multiple copies of the multicast data communication to the second multicast router device in the second datacenter due to the removal of each interface that provides a link to the second datacenter from outgoing interface VLANs that are part of a multicast route.

* * * * *